United States Patent
Martin et al.

(10) Patent No.: US 9,867,197 B2
(45) Date of Patent: Jan. 9, 2018

(54) COMMUNICATIONS SYSTEM, INFRASTRUCTURE EQUIPMENT, COMMUNICATIONS DEVICES AND METHOD

(71) Applicant: SONY CORPORATION, Tokyo (JP)

(72) Inventors: Brian Alexander Martin, Basingstoke (GB); Matthew William Webb, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/029,177

(22) PCT Filed: Oct. 3, 2014

(86) PCT No.: PCT/EP2014/071221
§ 371 (c)(1),
(2) Date: Apr. 13, 2016

(87) PCT Pub. No.: WO2015/071025
PCT Pub. Date: May 21, 2015

(65) Prior Publication Data
US 2016/0255616 A1 Sep. 1, 2016

(30) Foreign Application Priority Data
Nov. 14, 2013 (EP) .................................. 13192988

(51) Int. Cl.
*H04W 72/04* (2009.01)
*H04W 74/08* (2009.01)

(52) U.S. Cl.
CPC ..... *H04W 72/048* (2013.01); *H04W 74/0833* (2013.01); *H04W 72/0446* (2013.01)

(58) Field of Classification Search
CPC ........... H04W 72/0446; H04W 72/048; H04W 74/0833; H04B 7/2615; H04J 4/00; H04L 5/26
(Continued)

(56) References Cited

U.S. PATENT DOCUMENTS

2008/0273610 A1* 11/2008 Malladi ................ H04L 1/0029
                                                           375/260
2009/0041240 A1*  2/2009 Parkvall ............. H04W 74/004
                                                           380/247
(Continued)

FOREIGN PATENT DOCUMENTS

GB          2487757 A      8/2012
GB          2487780 A      8/2012
(Continued)

OTHER PUBLICATIONS

International Search Report dated Dec. 16, 2014 in PCT/EP2014/071221.
(Continued)

*Primary Examiner* — Robert Lopata
(74) *Attorney, Agent, or Firm* — Oblon, McClelland, Maier & Neustadt, L.L.P.

(57) ABSTRACT

A method of transmitting/receiving data between a communications device and a mobile communications network including a wireless access interface providing communications resources within a system bandwidth and in time divided units allocated to communications devices of first and second types having different capabilities. The method generates, at the communications device, a random access message, by selecting a sequence from a predetermined set of sequences, which have been allocated to the communications devices of the second type and transmitting the random access message from the communications device to the wireless communications network, and in response to the (Continued)

random access message, receives a random access response at the communications device transmitted according to the capability of the communications device of second type, the random access message being recognized as from a communications device of second type from the selected one of the predetermined sequences allocated to the communications devices of second type.

20 Claims, 11 Drawing Sheets

(58) Field of Classification Search
USPC .......................................................... 370/330
See application file for complete search history.

(56) References Cited

U.S. PATENT DOCUMENTS

| | | | |
|---|---|---|---|
| 2009/0175292 A1* | 7/2009 | Noh | H04W 74/006 370/462 |
| 2011/0199905 A1* | 8/2011 | Pinheiro | H04W 4/005 370/235 |
| 2012/0077507 A1 | 3/2012 | Lee | |
| 2012/0163311 A1 | 6/2012 | Park | |
| 2012/0289178 A1* | 11/2012 | Matsumura | H04W 52/0206 455/403 |
| 2013/0083753 A1 | 4/2013 | Lee et al. | |
| 2013/0182680 A1 | 7/2013 | Choi et al. | |
| 2014/0011506 A1 | 1/2014 | McNamara et al. | |
| 2014/0071930 A1* | 3/2014 | Lee | H04W 74/0833 370/329 |
| 2014/0302856 A1* | 10/2014 | Nory | H04W 48/10 455/437 |
| 2014/0362806 A1* | 12/2014 | Liu | H04W 72/14 370/329 |
| 2015/0009813 A1* | 1/2015 | Nguyen | H04W 4/005 370/230 |
| 2015/0023281 A1* | 1/2015 | Wu | H04W 52/146 370/329 |
| 2015/0156760 A1* | 6/2015 | Yu | H04W 4/005 370/330 |
| 2016/0150570 A1* | 5/2016 | Wang | H04W 4/005 370/329 |
| 2017/0094690 A1* | 3/2017 | Zhang | H04W 74/0833 |
| 2017/0150428 A1* | 5/2017 | Nory | H04W 48/16 |

FOREIGN PATENT DOCUMENTS

| | | |
|---|---|---|
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2497742 A | 6/2013 |
| GB | 2497743 A | 6/2013 |
| GB | 2508593 A | 6/2014 |
| WO | WO 2012/104631 A1 | 8/2012 |
| WO | WO 2013/049768 A1 | 4/2013 |
| WO | WO 2013/132327 A1 | 9/2013 |
| WO | WO 2014/087145 A1 | 6/2014 |

OTHER PUBLICATIONS

3GPP TSG-RAN WG2 #84 "Analysis of RAN2 Impacts of Low Cost UE", ZTE, (R2-133908), Nov. 11-25, 2013, 4 pages.
3GPP TSG-RAN WG2 #84 "Capabilities of Low Cost/Complexity MTC UEs", Ericsson, (R2-134299), Nov. 11-15, 2013, 7 pages.
3GPP TSG-RAN WG2 #84 "Impacts due to Narrow Bandwidth Characteristic of Low Cost MTC UE", LG Electronics Inc., Nov. 11-15, 2013, (R2-134371), 4 pages.
European Office Action dated Aug. 30, 2017 in corresponding European Application 14780503.0 (5 pages).

* cited by examiner

COMMUNICATIONS SYSTEM, INFRASTRUCTURE EQUIPMENT, COMMUNICATIONS DEVICES AND METHOD

CROSS-REFERENCE TO RELATED APPLICATIONS

The present application is based on PCT filing PCT/EP2014/071221 filed Oct. 3, 2014, and claims priority to European Patent Application 13 192 988.7, filed in the European Patent Office on Nov. 14, 2013, the entire contents of each of which being incorporated herein by reference.

FIELD OF THE DISCLOSURE

The present invention relates to communications systems, infrastructure equipment, and communications devices for communicating data, and methods of communicating data.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on.

Whilst it can be convenient for a terminal such as an MTC type terminal to take advantage of the wide coverage area provided by a third or fourth generation mobile telecommunication network there are at present disadvantages. Unlike a conventional third or fourth generation mobile terminal such as a smartphone, an MTC-type terminal is preferably relatively simple and inexpensive. The type of functions performed by the MTC-type terminal (e.g. collecting and reporting back data) do not require particularly complex processing to perform. As such, certain classes of telecommunications device, such as MTC devices, support "low capability" communication applications that are characterised, for instance, by the transmission of small amounts of data at relatively infrequent intervals. MTC devices are constructed so that individually they represent little burden on telecommunications networks and thus can be deployed in greater numbers than equivalent "full capability" terminals in the same networks.

In many scenarios, it is preferable to provide terminals dedicated to such "low capability" communication applications with a simple receiver unit (or transceiver unit) having capabilities more commensurate with the amount of data likely to be transmitted to (or from) the terminal.

To support MTC terminals, it has been proposed to introduce a "virtual carrier" operating within a bandwidth of one or more "host carriers": the proposed virtual carrier concept preferably integrates within the communications resources of conventional OFDM based radio access technologies and subdivides frequency spectrum in a similar manner to OFDM. Unlike data transmitted on a conventional OFDM type downlink carrier, data transmitted on the virtual carrier can be received and decoded without needing to process the full bandwidth of the downlink OFDM host carrier. Accordingly, data transmitted on the virtual carrier can be received and decoded using a reduced complexity receiver unit: with concomitant benefits such as increased simplicity, increased reliability, reduced form-factor and lower manufacturing cost.

However, when operating alongside each other the differing capabilities of conventional LTE devices and MTC devices may lead to increased complexity resource allocation and scheduling. Consequently, efficient operation of a wireless telecommunications system for MTC devices and conventional and legacy LTE devices is therefore desirable.

Other examples of "low capability" devices include those devices with a smaller number of receiving antennas than devices of "full capability" terminals and those devices with an ability to process a smaller number of information bits in a given time span than "full capability terminals".

Typically, "full capability" and "low capability" may be determined by reference to the specifications of a telecommunications network, and the specifications may make relative capability explicitly or implicitly stated.

SUMMARY OF THE DISCLOSURE

According to an example embodiment of the present disclosure, there is provided a method of transmitting data from a communications device to a mobile communications network or receiving data from the mobile communications network at the mobile communications device includes providing, by the mobile communications network, a wireless access interface, for transmitting and receiving data to and from communications devices. The wireless access interface provides communications resources within a system bandwidth and in time divided units providing communications resources within the system bandwidth for allocating to communications devices of a first type and a second type. The first type of the communications devices have a different capability to the second type of communications devices. The method comprises generating, at the communications device, a random access message, by selecting a sequence from a predetermined set of sequences, which have been allocated to the communications devices of the second type and transmitting the random access message from the communications device to the wireless communications network. The predetermined sequences may be for example preamble signatures (a bit sequence) and may include the same bits transmitted at a different frequency or time resource, so that a sequence may be a resource region arrangement. The sequence is therefore arranged to identify the communications device. The method further comprises in response to the random access message, receiving a random access response at the communications device transmitted according to the capability of the communications device of the second type, the random access message being recognised as being from a communications device of the second type from the selected one of the predetermined sequences allocated to the communications devices of the second type. According to this method a mobile communications network can be arranged to differentiate between communications devices of different types by allocating different sequences for use in forming the random access messages between the different types of communications devices and therefore respond to the random access message differently according to the capability of the communications devices of the different types.

According to a conventional arrangement for transmitting data on an up-link of a wireless access interface formed by a mobile communications network, a communications device is arranged to request communications resources on the up-link by transmitting a random access request. In response the mobile communications network transmits a random access response message in the shared resource of the down link of the wireless access interface.

As indicated above, embodiments according to the present disclosure have been devise in order to provide a mobile communications network to respond differently to communications devices of different types by allocating different sets of sequences for forming random access messages to devices of different types, so that in response to the random access message, the communications network can recognise the devices of the different types and transmit a random access response message in accordance with the type of the device. The type of the communications device may represent a different capability of the device. For example, as indicated above the devices may have a different maximum bandwidth of a communications channel in which signals are received, a different minimum number of antennas available to the communications devices of the first type compared with the communications devices of the second type or a different maximum rate of processing information bits.

More generally by arranging for the different sets of sequences to be allocated to different types of communications devices, the mobile communications network can partition the communications resources of the system bandwidth between the communications devices of the different types. Accordingly some of the communications resources of the system bandwidth may be 'hidden' from one of the types of the communications devices.

In one example the communications device of the second type may be a reduced capability device, which is arranged to communicate via a virtual carrier. If the wireless access interface is arranged to include a virtual carrier then any response to a random access message must be transmitted within the shared resources of the virtual carrier. However if the mobile communications network is not able to distinguish between conventional communications devices (legacy UEs) and reduced capability devices (MTC UEs), then any and all responses to random access messages for all communications devices must be transmitted within the resources of the virtual carrier. This would then restrict the capacity of the mobile communications network to allocate the communications resources of the wireless access interface for all communications devices (legacy and MTC type).

According to the present technique reduced capability devices (MTC UEs) are provided with a predetermined subset of sequences, which form the preambles of random access messages. As such the mobile communications network can respond to such random access messages from reduced capability devices within the resources of the virtual carrier and respond to random access messages to conventional/legacy devices within any of resources of the shared channel, thereby avoiding or at least reducing any restriction of the network's ability to allocate communications resources.

In other examples the mobile communications network is arranged to configured the wireless access interface so that communications resources for the communications device to transmit the random access messages are adapted to the capability of the different types of communications devices.

Various further aspects and embodiments of the disclosure are provided in the appended claims, including, but not limited to, a communications device, infrastructure equipment and methods of communicating data between a communications device and in infrastructure equipment.

BRIEF DESCRIPTION OF THE DRAWINGS

Embodiments of the present disclosure will now be described by way of example only with reference to the accompanying drawings wherein like parts are provided with corresponding reference numerals and in which.

DETAILED DESCRIPTION OF EXAMPLE EMBODIMENTS

Network Architecture

Figure 1:
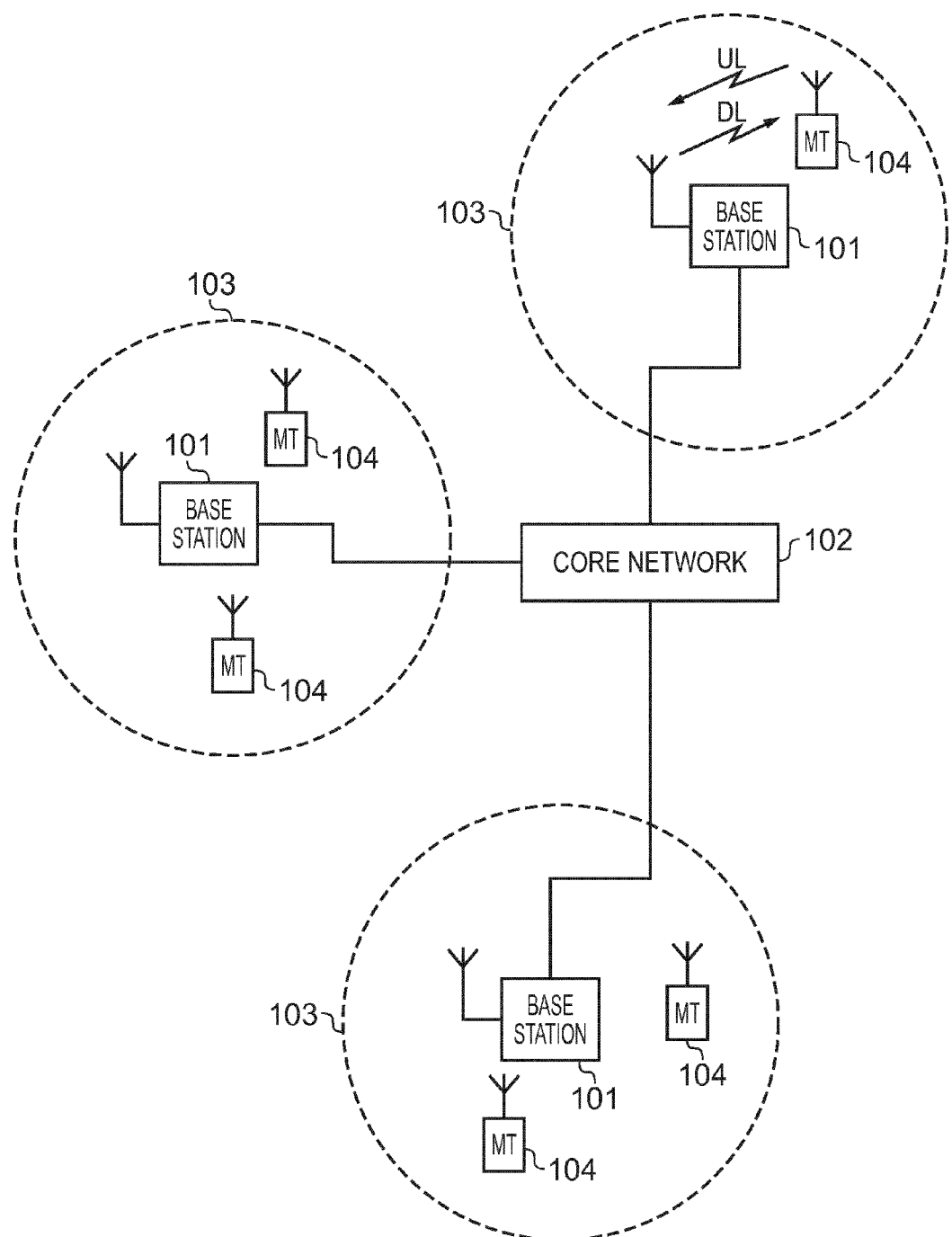
FIG. 1 provides a schematic diagram illustrating an example of a conventional mobile telecommunications network.

FIG. 1 provides a schematic diagram illustrating a conventional mobile communications system. The system includes a plurality of base stations 101 connected to a core network 102 where the base stations and core network are arranged to provide a wireless radio interface. Each of the plurality of base station provides a service area 103 and serves a plurality of communications devices 104 which are located within the service area 103. Each of the communications devices 104 within a service area transmits and receives data to and from the base station 101 over a radio uplink and a radio downlink respectively of the wireless interface. Correspondingly, each base station transmits and receives data to and from the communications devices that are within its service area over the radio downlink and radio uplink respectively. Data transmitted to the base stations 101 may be routed to the core network 102 so that services such as for example voice calling, internet access, authentication, mobility management and charging and so on may be provided. In some examples FIG. 1 may represent an LTE network and the base stations may be referred to as enhanced Node B (eNodeB or eNB) and in other examples the base station and core network may be referred to infrastructure equipment. In an LTE network the communications devices may also be referred to as user equipment (UE), which may for example be mobile telephones, tablets, machine type communications devices etc. However, in other examples the communications devices may be referred to as mobile terminals and communications devices etc.

Mobile telecommunications networks or systems utilise a wide variety of different radio interfaces, for example, 3GPP LTE utilises an Orthogonal Frequency Division Multiplexing (OFDM) radio interface. OFDM operates by dividing the available bandwidth into a plurality of orthogonal sub carriers and then dividing up this resource to form a predetermined structure which can convey data to the communications devices in a system. In the downlink of an LTE system the available resources are divided temporally into radio frames which last 10 ms, with each frame comprising 10 subframes which each last 1 ms. The subframes of an LTE signal are then further divided into OFDM symbols and resource blocks that comprise 12 subcarriers over a period of 0.5 ms or 6 or 7 symbols. These resource blocks form the physical channels of a LTE subframe which are used to carry data on the downlink and the uplink.

Figure 2:
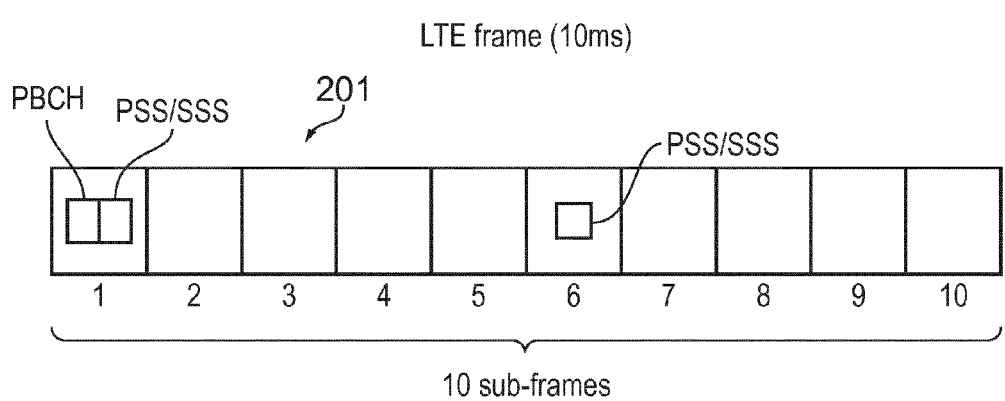
FIG. 2 provides a schematic diagram illustrating a conventional 3GPP long term evolution radio frame.

FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame. A primary broadcast channel (PBCH) is transmitted in the first sub-frame of the LTE frame. The PSS, SSS and PBCH are discussed in more detail below.

Figure 3:
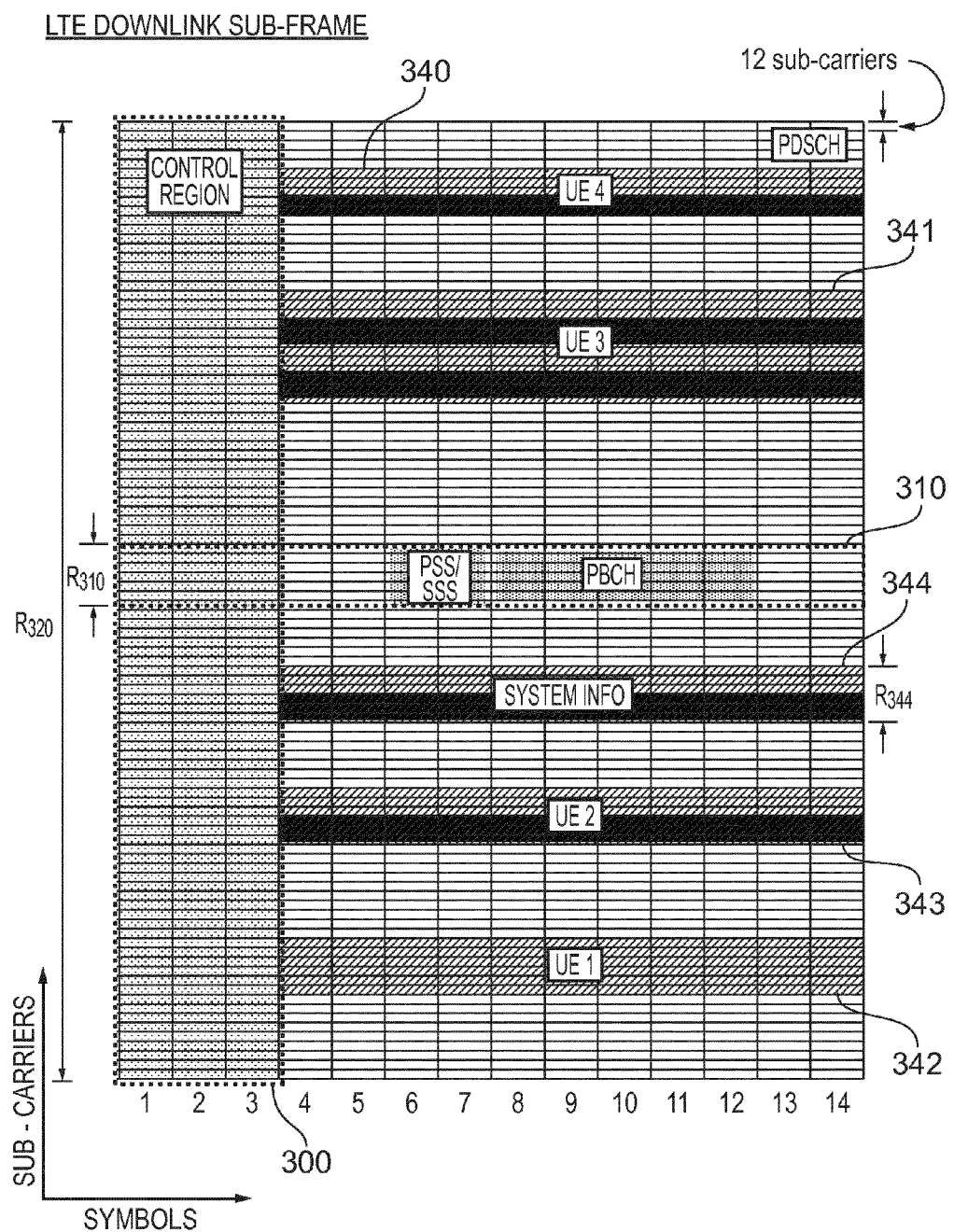
FIG. 3 provides a schematic diagram illustrating an example of a conventional LTE downlink radio sub-frame.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 3, each individual resource element is not shown, instead each individual box in the sub-frame grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers, the resource allocation 343 for a second LTE terminal (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. For clarity, the following description relates to host carriers with channel bandwidth of 3 MHz or greater where the maximum value of n will be 3. The data transmitted in the control region 300 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the first block of resources 342, that UE2 has been allocated the second block of resources 343, and so on. The PCFICH contains control data indicating the size of the control region (i.e. between one and three symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow the LTE terminal 104 to achieve frame synchronisation and determine the cell identity of the enhanced Node B transmitting the downlink signal. The PBCH carries information about the cell, comprising a master information block (MIB) that includes parameters that the LTE terminals require to access the cell. Data transmitted to individual LTE terminals on the physical downlink shared channel (PDSCH) can be transmitted in the remaining blocks of resource elements of the sub-frame. Further explanation of these channels is provided in the following sections.

FIG. 3 also shows a region of PDSCH containing system information transmitted on a broadcast channel and extending over a bandwidth of $R_{344}$.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, data transmitted on the PDCCH, PCFICH and PHICH is typically distributed on the sub-carriers across the entire bandwidth of the sub-frame. Therefore a conventional LTE terminal must be able to receive the entire bandwidth of the sub-frame in order to receive and decode the control region.

Conventional Camp on Procedure

Figure 4:
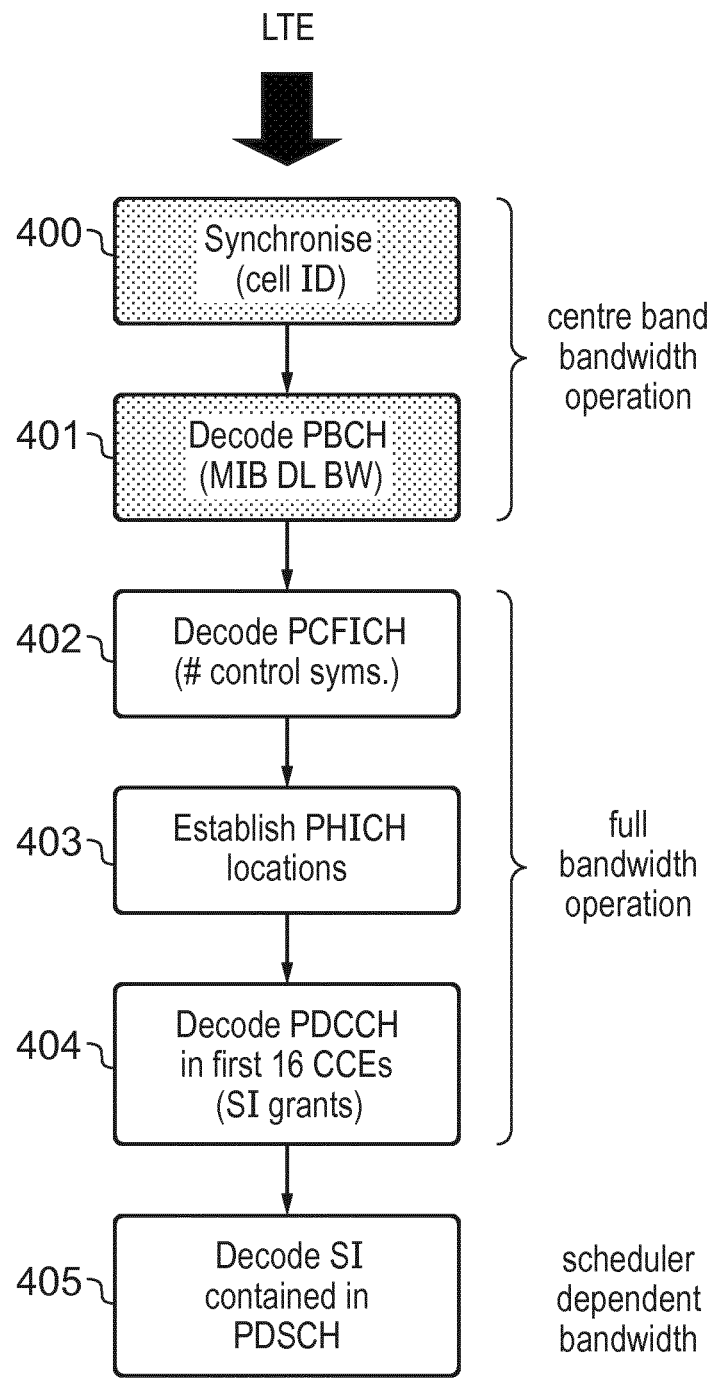
FIG. 4 provides a schematic diagram illustrating a conventional LTE "camp-on" procedure.

FIG. 4 illustrates a conventional LTE "camp-on" process, which is the process followed by a terminal so that it can decode downlink transmissions that are sent by a base station via a downlink channel on a carrier band. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band 310 of the carrier as mentioned above. As can be seen with reference to FIG. 3 the centre band 310 has a bandwidth range R310, where the band is at the centre of the carrier (i.e. occupying the central sub-carriers).

The terminal detects this centre band and detects the PSS and SSS which indicate the cyclic prefix duration and the Cell ID. In LTE the PSS and SSS are only transmitted in the first and sixth sub-frames of each radio frame. Of course, in a different system, for example a non-LTE system, the band 310 may not be at the centre of the carrier band and may be wider or narrower than 72 sub-carriers or 1.08 MHz. Likewise, the sub-frames may be of a different size or sizes.

The terminal then decodes the PBCH (step 401), also carried on the centre band 310, where the PBCH includes in particular the Master Information Block (MIB). The MIB indicates in particular the bandwidth $R_{320}$ of the downlink carrier, the System Frame Number (SFN), and the PHICH configuration. Using the MIB carried on the PBCH, the terminal can then be made aware of the bandwidth $R_{320}$ of the carrier. Because the terminal also knows where the central band 310 is, it knows the exact range $R_{320}$ of the downlink carrier.

For each sub-frame, the terminal then decodes the PCFICH which is distributed across the entire width of carrier 320 (step 402). As discussed above, an LTE downlink carrier can be up to 20 MHz wide (1200 sub-carriers) and an LTE terminal therefore has to have the capability to receive and decode transmissions on a 20 MHz bandwidth in order to decode the PCFICH. At that stage, with a 20 MHz carrier band, the terminal operates at a much larger bandwidth (bandwidth of $R_{320}$) than during steps 400 and 401 (bandwidth of $R_{310}$) relating to synchronization and PBCH decoding.

The terminal then ascertains the PHICH locations (step 403) and decodes the PDCCH (step 404), in particular for identifying system information transmissions and for identifying its personal allocation grants. The allocation grants are used by the terminal to locate system information and to locate its data in the PDSCH. Both system information and personal allocations are transmitted on PDSCH and scheduled within the carrier band 320. Steps 403 and 404 also require the terminal to operate on the entire bandwidth R320 of the carrier band.

At steps 402 to 404, the terminal decodes information contained in the control region 300 of a sub-frame. As explained above, in LTE, the three control channels mentioned above (PCFICH, PHICH and PDCCH) can be found across the control region 300 of the carrier where the control regions extends over the range $R_{320}$ and occupies the first one, two or three OFDM symbols of each sub-frame as discussed above. In a sub-frame, typically the control channels do not use all the resource elements within the control region 300, but they are scattered across the entire region, such that a LTE terminal has to be able to simultaneously receive the entire control region 300 for decoding each of the three control channels.

The terminal can then decode the PDSCH (step 405) which contains system information or data transmitted for this terminal.

As explained above, in an LTE sub-frame the PDSCH generally occupies groups of resource elements which are neither in the control region nor in the resource elements occupied by PSS, SSS or PBCH. The data in the blocks of resource elements 340, 341, 342, 343 shown in FIG. 3 have a smaller bandwidth than the bandwidth of the entire carrier although to decode these blocks, a terminal first receives the PDCCH across the frequency range $R_{320}$ and if the PDCCH indicates that a PDSCH resource should be decoded, once it has received the entire sub-frame, it then decodes only the PDSCH in only the relevant frequency range indicated by the PDCCH. So for example, UE 1 discussed above decodes the whole control region 300 and then the data in the resource block 342.

Virtual Downlink Carrier

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE terminals. In many scenarios, providing low capability terminals such as those with a conventional high-performance LTE receiver unit capable of receiving and processing data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal. As set out below, in accordance with examples of the present disclosure a "virtual carrier" is inserted in a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier. Accordingly, data transmitted on the virtual carrier can be received and decoded using a reduced complexity receiver unit.

Figure 5:
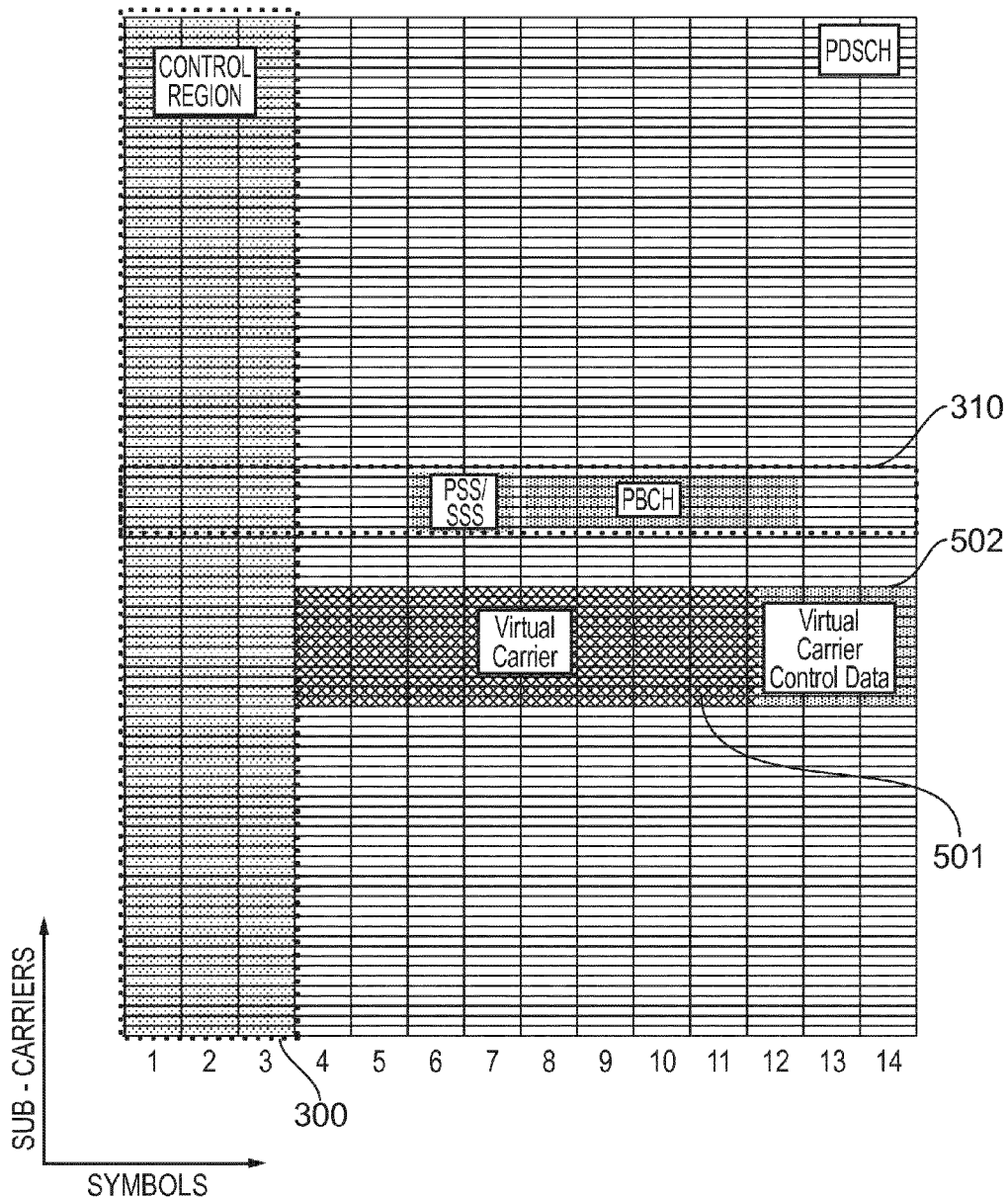
FIG. 5 provides a schematic diagram illustrating an LTE downlink radio sub-frame in which includes a virtual carrier.

FIG. 5 provides a schematic diagram illustrating an LTE downlink sub-frame which includes a virtual carrier inserted in a host carrier in accordance with an example of the present disclosure.

In keeping with a conventional LTE downlink sub-frame, the first n symbols (n is three in FIG. 5) form the control region 300 which is reserved for the transmission of downlink control data such as data transmitted on the PDCCH. However, as can be seen from FIG. 5, outside of the control region 300 the LTE downlink sub-frame includes a group of resource elements below the central band 310 which form a virtual carrier 501. As will become clear, the virtual carrier 501 is adapted so that data transmitted on the virtual carrier 501 can be treated as logically distinct from the data transmitted in the remaining parts of the host carrier and can be decoded without first decoding all the control data from the control region 300. Although FIG. 5 shows the virtual carrier occupying frequency resources below the centre band, in general the virtual carrier can alternatively either occupy frequency resources above the centre band or frequency resources including the centre band. If the virtual carrier is configured to overlap any resources used by the PSS, SSS or PBCH of the host carrier, or any other signal transmitted by the host carrier that a communications device operating on the host carrier would require for correct operation and expect to find in a known pre-determined location, the signals on the virtual carrier can be arranged such that these aspects of the host carrier signal are maintained.

As can be seen from FIG. 5, data transmitted on the virtual carrier 501 is transmitted across a limited bandwidth. This could be any suitable bandwidth providing it is smaller than that of the host carrier. In the example shown in FIG. 5 the virtual carrier is transmitted across a bandwidth comprising 12 blocks of 12 sub-carriers (i.e. 144 sub-carriers) which is equivalent to a 2.16 MHz transmission bandwidth. Accordingly, a terminal receiving data transmitted on the virtual carrier need only be equipped with a receiver capable of receiving and processing data transmitted over a bandwidth of 2.16 MHz. This enables low capability terminals (for example MTC type terminals) to be provided with simplified receiver units yet still be able to operate within an OFDM type communication network which, as explained above, conventionally requires terminals to be equipped with receivers capable of receiving and processing an OFDM signal across the entire bandwidth of the signal.

As explained above, in OFDM based mobile communication systems such as LTE, downlink data is dynamically assigned to be transmitted on different sub-carriers on a sub-frame by sub-frame basis. Accordingly, in every sub-frame the network must signal which sub-carriers on which symbols contain data relevant to which terminals (i.e. downlink grant signalling).

Accordingly, as can be seen in FIG. 5, the final symbols of the virtual carrier can be reserved as a virtual carrier control region 502 which is allocated for the transmission of control data. In some examples the number of symbols comprising the virtual carrier control region 502 is fixed for example three symbols. In other examples the virtual carrier control region 502 can vary in size, for example between one and three symbols.

The virtual carrier control region can be located at any suitable position within the virtual carrier for example in the first few symbols of the virtual carrier. In the example of FIG. 5 this could mean positioning the virtual carrier control region on the fourth, fifth and sixth symbols. However, fixing the position of the virtual carrier control region in the final symbols of the sub-frame can provide an advantage because the position of the virtual carrier control region need not vary even if the number of symbols of the host carrier control region varies. This simplifies the processing undertaken by communication devices receiving data on the virtual carrier because there is no need for them to determine the position of the virtual carrier control region every sub-frame as it is known that it will always be positioned in the final symbols of the sub-frame.

In a further embodiment, the virtual carrier control symbols may reference virtual carrier PDSCH transmissions in a separate sub-frame.

In some examples the virtual carrier may be located within the centre band 310 of the downlink sub-frame. This would minimise the reduction in host carrier PDSCH resources caused by the insertion of a virtual carrier since the resources occupied by the PSS/SSS and PBCH would be contained within the virtual carrier region and not the host carrier PDSCGH region. Therefore, depending on for example the expected virtual carrier throughput, the location of a virtual carrier can be appropriately chosen to either exist inside or outside the centre band according to whether the host or virtual carrier is chosen to bear the overhead of the PSS, SSS and PBCH.

The virtual carrier concept is also described in a number of co-pending patent applications (including GB 1101970.0, GB 1101981.7, GB 1101966.8, GB 1101983.3, GB 1101853.8, GB 1101982.5, GB 1101980.9 and GB 1101972.6), the contents of which are incorporated herein by reference.

LTE Random Access Procedure

LTE system information comprises a configuration of a number of identifiers or identifying sequences. These identifiers/sequences are then included in preambles which are used for random access for communications devices. The uplink subframes may comprise a corresponding physical random access channel (PRACH) over which preambles or other identifying numbers or sequences may be sent where the possible locations of PRACH channels are indicated in the system information according to sets of possibilities defined in system specifications. According to one aspect of the present technique the PRACH and the identifiers/sequences which are used by the different types of communications devices are dynamically configured in order to allocate different communications resources of the wireless access interface. This will be explained shortly. However, first the random access procedure will be explained in more detail below.

Figure 6:
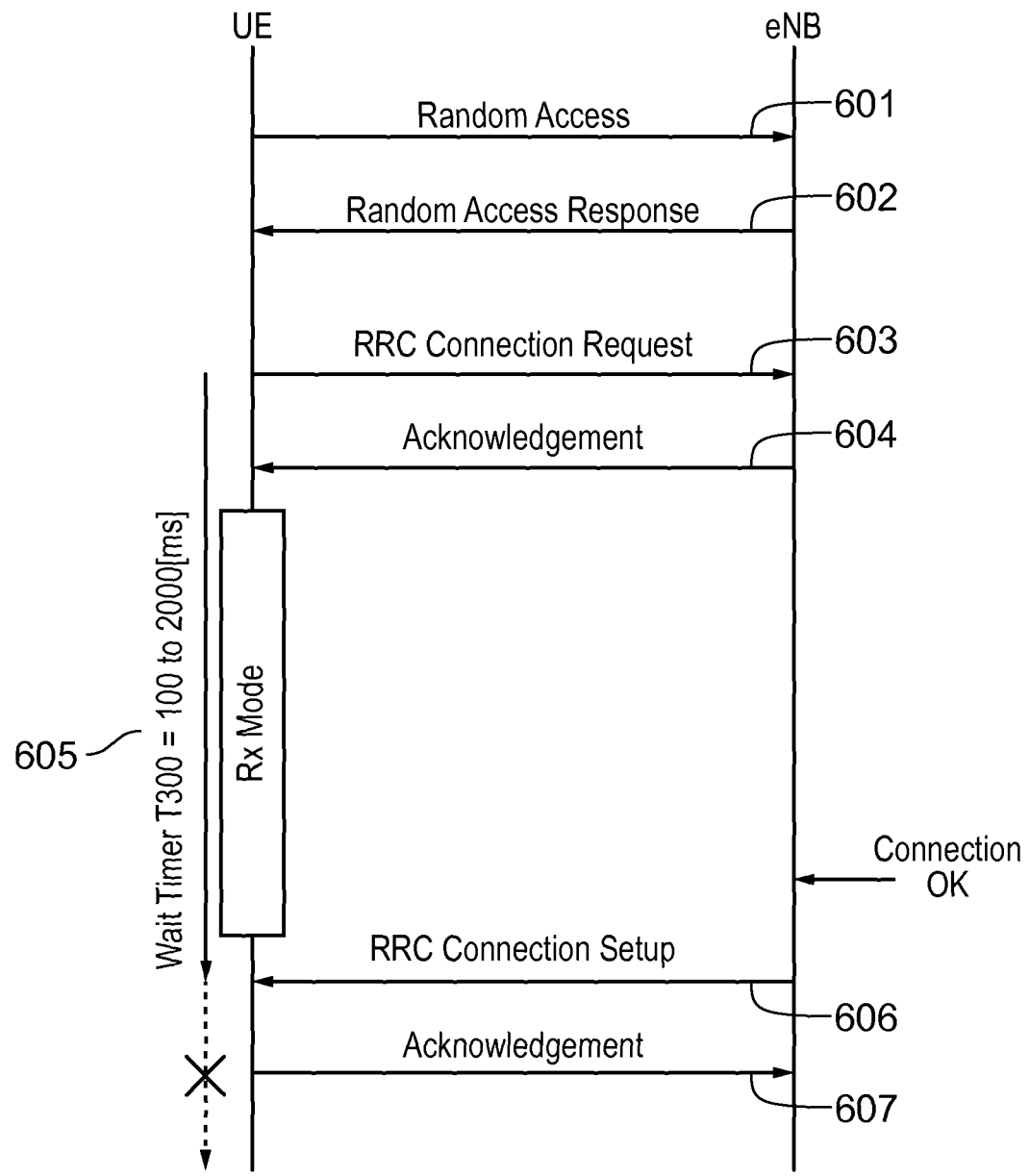
FIG. 6 provides a diagram of an example RCC connection procedure in an LTE network.

FIG. 6 provides a diagram illustrating the process by which a communications device may connect to a base station in an LTE network and therefore transition between RRC Idle to RRC_Connected. Initially the communications device is not synchronised with the OFDM frames and therefore the communications device is required to perform the previously described camp-on procedure. Once synchronised with the downlink frames the communications device is able to receive the control information on the PDCCH and PBCH and subsequently receive the system information which conveys the identifiers for the preambles, the number of preambles available for use in the cell e.g. 64 and PRACH location which is used for an uplink random access procedure. Once an identifier has been received and or selected the associated preamble is transmitted over the PRACH channel to the base station as a random access request message illustrated by the communication 601 in FIG. 6. The transmission of the random access request message to the base station indicates that the communications device requires resources in the up-link and possibly the downlink to be allocated. In response to receiving the random access request message the base station allocates resources to the communications device and transmits a random access request response message 602 to the communications device. The random access response 602 indicates to the communications device the resources which have been allocated to it and allows the communications device to synchronise with the uplink frames of the base station so that a further random access procedure is not required and timing advance can be implemented.

In response to receiving the random access response 602 and being synchronised with the uplink frames of the base station, the communications device may transmit a radio resource control (RRC) connection request 603 to the base station over the up-link resources allocated to the communications device in the random access response 602. This RRC connection request represents a request to the communications network to establish a radio communications bearer for transmitting data to and/or from the communications device and the communications network or base station, however, it may also be a request for other types of service from the base station. When the RRC connection request message 603 has been received by the base station the base station acknowledges the correct receipt of the request by transmitting an acknowledgment 604 to the communications device. The acknowledgment 604 does not represent a successful connection but simply the correct reception of the data within the RRC connection request. The correct reception of the request may be assessed via the use of a cyclic redundancy check (CRC) or similar error detection methods. A further request confirming an RRC connection setup 606 is required to be transmitted and received by the base station and communications device respectively. In a mobile communication system such as that depicted in FIG. 1, when a connection or other request is made by a communications device this request may be required to be passed onto a subsequent entity in the core network, for example an base station may pass a request onto an MME or SGW. Consequently, the processing time associated with an RRC connection request may be variable and a response to a RRC connection request may not be transmitted by the base station to a communications device immediately. In order take account of this situation, in an LTE system the communications device attempts to receive a response to the RRC connection request in a window of a predetermined duration. In response to the sending of the RRC connection request the communications device commences a wait timer 605 during which the communications device attempts to receive a response to the RRC connection request. For example, in an LTE system the device sets a wait timer to a one of a plurality of predetermined values specified by a timer T300 that is broadcast by the base station in the system information block, where the timer may have a value of up to 2000 ms. Once the RRC connection request has been processed and the connection is confirmed, a RRC connection setup message 606 is transmitted to the communications device and received by the communications device if it is transmitted before expiry of the wait timer at the communications device. Once the communications device has received the RRC connection setup the communications device transmits an acknowledgement 607 to the base station in order to acknowledge the safe receipt of the RRC connection setup message. If an acknowledgment is not received by the base station, the base station may retransmit the RRC connection setup message.

Contention and Non-Contention Based LTE Random Access Procedures

Whilst FIG. 6 provides a general overview of the random access procedure the exact content of the messages may vary depending upon the exact variety of random access procedure being performed. For instance, a random access procedure in an LTE system may be contention or non-contention based procedure depending on the base station the communications device and a nature purpose of the data which is to be sent once the a connection is established.

Figure 7A:
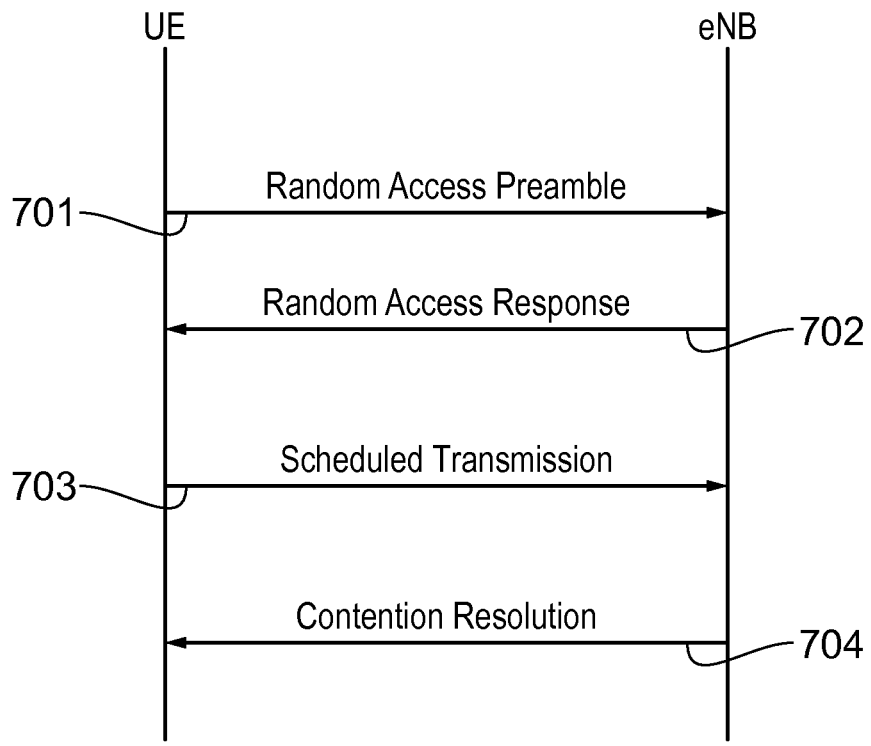
FIG. 7a provides an illustration of an LTE contention based access request procedure.

FIG. 7a illustrates an LTE contention based random access procedure that a user device may perform in order to request access to an LTE network. Firstly, the user device selects a random access preamble from a set of contention based random access preambles that has been broadcast in a system information block (SIB) such as SIB2 in a downlink frame by the base station. The user device then transmits the selected random access preamble 701 to the base station where this transmission acts as an access request message for requesting access to the network, the preamble acts as a user device identifier and the preamble 701 is equivalent to 601 of FIG. 6. The random access preamble may be transmitted on a physical channel within the wireless access interface such as a physical random access channel (PRACH) of an uplink frame. Once the random access preamble has been received by the base station, at step 702 the base station transmits a response message, such as for example, a random access response (RAR which equivalent to 602 of FIG. 6). The resources in time and frequency of a downlink channel, such as a physical downlink shared channel (PDSCH), in which the user device can find the RAR are indicated in a message on a control channel such as physical downlink control channel (PDCCH) addressed to a random access radio network temporary identifier (RA-RNTI) and which is transmitted in the same subframe as the response message. This message is therefore required to be received prior to receiving the response message. In particular, a downlink control information (DCI) message informing the user device of the resources where the response message can be found in the current subframe is sent on the PDCCH, where the RA-RNTI is formed from a time and, in some examples, a frequency identifier of transmission of the associated access request message. The response message contains at least the identity of the received preamble, a timing alignment command, an allocated uplink resource grant and a temporary Cell RNTI (C-RNTI). Upon receiving the response message, the user device transmits a scheduled transmission containing its intended message, such as a radio resource controller (RRC) connection request, in the allocated uplink resources as shown by step 703 where the message may be an RRC connection request as shown by 603 in FIG. 6. Finally at step 704, upon receiving the intended message the base station transmits a contention resolution message which may be equivalent to the acknowledgment 604 of FIG. 6. The contention resolution message is then acknowledged by the user device to which the contention resolution message is addressed, for example with a HARQ ACK/NACK. This procedure thus overcomes the possibility of multiple user devices utilising the same preamble and or transmitting a random access request over the same channel at the same time.

Figure 7B:
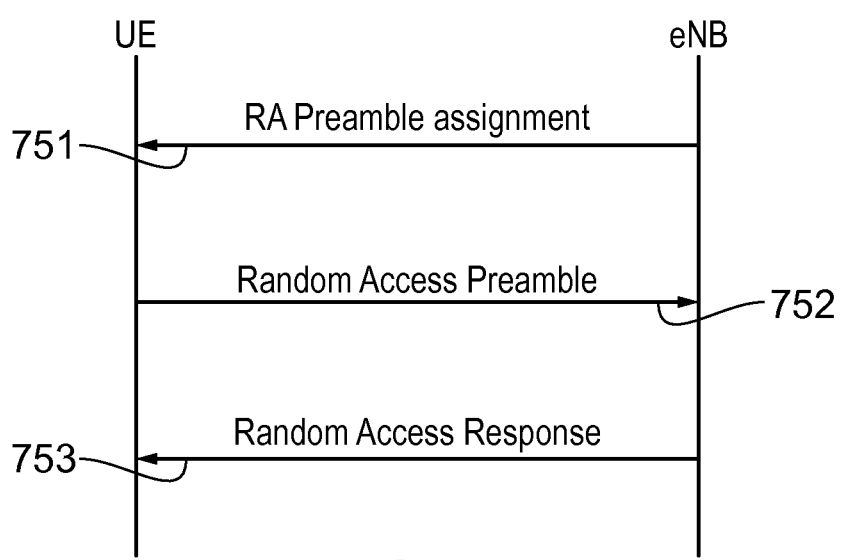
FIG. 7b provides an illustration of an LTE non-contention based access request procedure.

FIG. 7b illustrates an example of a non-contention based random access procedure for requesting resources or for preforming handover in an LTE network where the preamble is allocated to the communications device by the base station from a predefined set of non-contention based preambles. At step 751, prior to the transmission of a random access preamble from the user device in the access request message, the base station allocates a preamble from a non-contention based set of preambles to the user device. This allocation may be performed via a format 1A downlink control information (DCI) message on the PDCCH or in a handover command if the user device has recently entered a cell served by the base station. At step 752 the user device transmits its allocated preamble to the base station. Once the preamble has been received at the base station, the base station transmits a response message, such as for example a random access response, at step 753 where the response message contains similar information to the response message sent at step 702 of FIG. 7a. Once the response message has been received at the user device, the user device then transmits its intended message in the allocated uplink resources indicated in the response message.

Although the contention and non-contention based random access procedures have been described separately, the two approaches may co-exist in a cell or system where a set of preambles is divided into contention based and non-contention based groups. This division and size of the groups may be indicated by the base station in the SIB2 using the fields numberofRaPreambles and sizeOfRaPreamblesGroup for example so that the communications device can select a preamble from the appropriate group when it is required to perform a random access procedure.

When performing random access procedures for conventional LRE device such as non-MTC devices and other legacy devices, the random access response may be transmitted in any of the available resources in the PDSCH, where the location is indicated in the PDCCH. Accordingly, to be able to receive the random access response the conventional devices are required to be operable to receive data from across substantially the entire bandwidth of the system. Whilst this does not present a problem for conventional LTE devices, this approach does not take account of the reduced bandwidth capability of low cost and complexity devices such as MTC devices which may be configured to operate with across a reduced bandwidth and or in accordance the virtual carrier concept described above. For instance, if a random access response intended for an MTC is transmitted in the PDSCH outside of the virtual carrier the intended MTC device will be unable to receive the random access response.

In order to overcome this problem, base stations may be configured to transmit random access responses in a restricted set of PDSCH resources across which the virtual carrier may operate. Consequently, MTC device will be able to receive their intended random access responses without being required to increase their reception bandwidth. However, although this addresses the MTC reception issue, this approach may result in congestion in the restricted set of PDSCH recourse because substantially all random access response will be required to be transmitted in the restricted set of resources as the base station may not able to differentiate between random access requests from MTC and random access requests from conventional LTE devices. Thus the base station may not be capable of scheduling only MTC random access responses for the restricted set of resources. The effect of the congestion may manifest itself in a number of forms, for instance cell capacity as a whole may be reduced because fewer random access responses can be scheduled overall, and fewer communications devices may be served at initially RRC connection thus leading to call setup delays. Both of these effects may adversely impact on end user service.

The problem of resource allocation in systems where MTC or other reduced bandwidth devices and conventional LTE devices coexist has been addressed in documents that have been submitted for discussion to the 3GPP standardisation process, including "Analysis of RAN2 Impacts of Low Cost UE" ZTE (R2-133908) [9], "Capabilities of Low Cost/Complexity MTC UEs" Ericsson (R2-134299) [10], and "Impacts of Narrow Bandwidth Characteristic of Low Cost MTC UE" LG Electronics Inc. (R2-134371). For instance, in "Capabilities of Low Cost/Complexity MTC UEs" Ericsson (R2-134299) [11], in order to overcome the problem described above, it is proposed that base stations may be configured to transmit random access responses in a restricted set of PDSCH resources across which the virtual carrier may operate. Consequently, MTC device will be able to receive their intended random access responses without being required to increase their reception bandwidth. However, although this addresses the MTC reception issue, this approach may result in congestion in the restricted set of PDSCH recourse because substantially all random access response will be required to be transmitted in the restricted set of resources as the base station may not able to differentiate between random access requests from MTC and random access requests from conventional LTE devices. Thus the base station may not be capable of scheduling only MTC random access responses for the restricted set of resources. The effect of the congestion may manifest itself in a number of forms, for instance cell capacity as a whole may be reduced because fewer random access responses can be scheduled overall, and fewer communications devices may be served at initially RRC connection thus leading to call setup delays. Both of these effects may adversely impact on end user service.

Adapted Random Access Procedure

A wireless access interface which is adapted to include a virtual carrier resource may be thought of as providing a "T-shape" because the control channel, which corresponds to the LTE PDCCH forms a first part of a sub-frame and stretches across the system bandwidth, whereas the virtual carrier resources are formed substantially within the centre of the shared channel resources, corresponding to the PDSCH of LTE, thus forming a T-shape. In a T-Shaped allocation, MTC UEs will receive full bandwidth PDCCH, but is configured to receive PDSCH allocation only within a restricted narrow bandwidth. This would reduce the baseband processing required at the MTC UE, hence would lower the implementation cost of such UE. In order to maintain backward compatibility, it will be desired that the PDCCH structure is kept unchanged.

Figure 8:
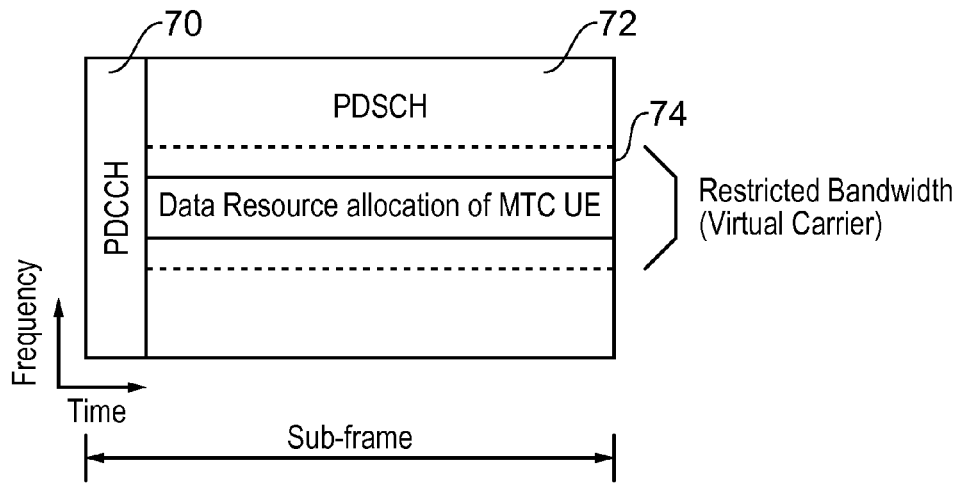
FIG. 8 is a simplified representation of a sub-frame of a down-link wireless access interface corresponding to the example shown in FIG. 3, showing a "T-shaped" virtual carrier.

A simplified representation of a T-shaped arrangement of a wireless access interface including a virtual carrier is shown in FIG. 8. As can be seen in FIG. 8, control channel 70 which for the example of LTE is the PDCCH is shown at the start of a sub-frame which also includes a shared channel which corresponds to the PDSCH for LTE. Substantially in the centre of the PUSCH is a region of resources forming a virtual carrier 74 which includes data resource allocation for reduced capability devices also known as MTC UEs.

As explained above sequences which are used to identify a communications device which has transmitted a random access signal are formed from a set of sequences. The sequences form preambles of the random access messages. The sequences may be spreading sequences but in other examples the "sequence" may refer not only to the possible preamble signature (i.e. the actual bits) but may also include the same bits transmitted in a different frequency or time resource. The sequence may also mean "resource region arrangements" so that "sequence" may be used interchangeably with "resource region arrangement".

According to the present technique the network reserves a subset of sequences or random access preambles which the reduced capability UEs use when transmitting a random access message. According to this arrangement the communications network can avoid having to schedule the random access response messages in the restricted subset of resources of the virtual carrier for all UEs.

In a first embodiment, this is achieved by arranging for the MTC UEs to select only among a subset of random access preambles which are indicated to be for use with low cost devices. Furthermore conventional UEs (LTE Release 12 UEs) which are not reduced capability devices can avoid selecting one of these number N reserved random access preambles. UEs not operable in accordance with this disclosure are unaware of this arrangement, and hence the probability of a legacy UE being impacted is N/64 (if there are 64 random access preambles). In one example other legacy or conventional UEs selecting a preamble which is not in the reserved range can be scheduled outside of the reduced bandwidth region.

Figure 9A:
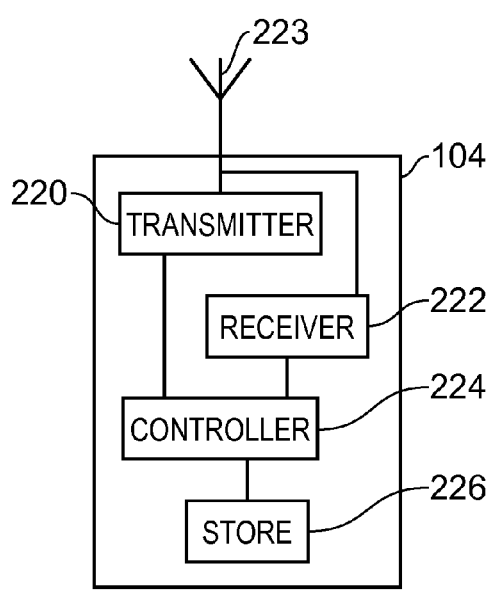
FIG. 9a is a schematic block diagram of a communications device according to the present technique.
Figure 9B:
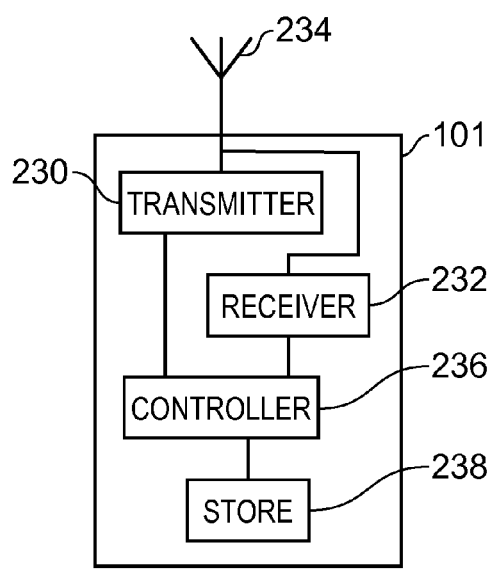
FIG. 9b is a schematic block diagram of an adapted base station (eNodeB) according to the present technique.

A communications device (MTC UE) 104 and an adapted eNodeB 101 are shown in FIGS. 9*a* and 9*b*. As shown in FIG. 9*a*, the MTC UE includes a transmitter 220 and a receiver coupled to an antenna 223 and a controller 224. The controller 224 also has access to a data store which includes the predetermined sequences for forming the random access messages. Similarly, the adapted eNodeB 101 includes a transmitter 230 and a receiver 232 coupled to an antenna 234 and a controller 236. The controller 236 has access to a data stored 238 which has stored therein the set of sequences or preambles for forming the random access messages.

Figure 10:
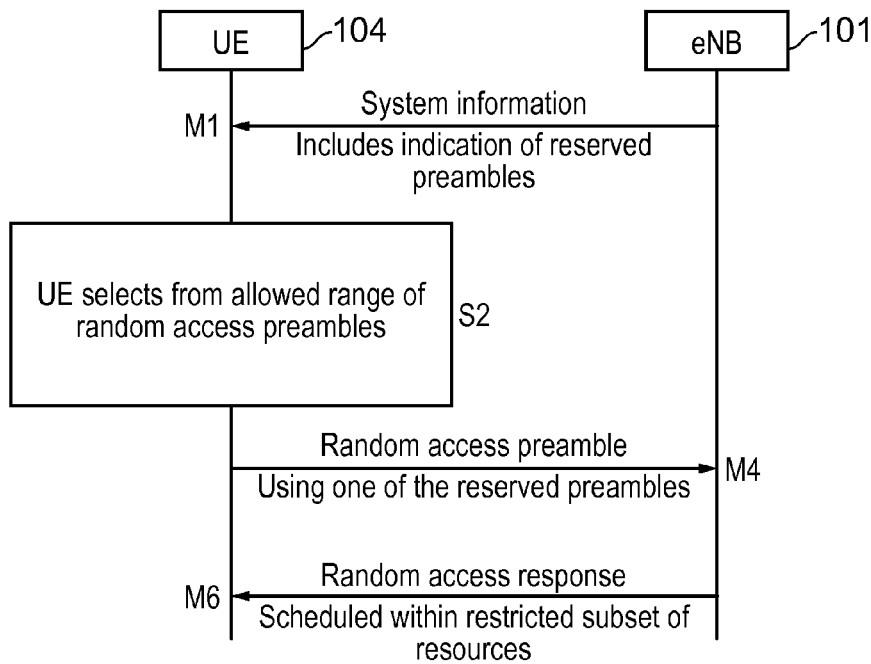
FIG. 10 is an illustrative flow diagram providing an example operation of the communications device and the base station of FIGS. 9a and 9b according to the present technique.

FIG. 10 provides a schematic signalling flow diagram representing an example operation of the MTC UE 104 and the base station 101 according to the present technique:

M1: Optionally, the adapted eNodeB 101 is arranged to select the predetermined set of sequences from a set of sequences for use by MTC UEs which are accessing the communications resources of the virtual carrier. In one example, the adapted eNodeB 101 then transmits an indication of the predetermined set of sequences, which are allocated to the MTC UEs within a cell using a broadcast channel. For the example of LTE this can be done using the system information (SI), which includes the indication of the allocation of the predetermined set of preambles (sequences) for generating the random access messages. As explained below, in one example a total set of sequences comprises non-contention based sequences and contention based sequences, and the predetermined set of sequences which are allocated to the MTC UEs are selected from the non-contention based sequences S2: The communications device 104 generates a random access message, by selecting a sequence from the predetermined set of sequences, which have been allocated to MTC UEs which are transmitting or receiving signals via the virtual carrier bandwidth.

M4: The communications device 104 transmits the random access message from the communications device via the wireless access interface provided by the wireless communications network.

M6: In response to the random access message, the communications device 104 receives a random access response message at the communications device transmitted from communications resources allocated to the communications device within the virtual carrier bandwidth, the random access message being recognised as being from a reduced capability terminal from the selected one of the predetermined sequences allocated to reduced capability terminals.

In a second embodiment, in which the mobile communications network configures the allocation of preamble sequences, the mobile communications network reduces the number of preambles signalled to legacy UEs using the parameter numberOfRA-Preambles. The parameter indicates the number of contention based (i.e. non-dedicated) preambles available, which are those available for use in initial access. The remaining available preambles are non-contention based, i.e. dedicated preambles. These can be explicitly signalled to the UE in a PDCCH order for use e.g. at handover.

As indicated above, the mobile communications network would then signal to MTC UEs the number of preambles reserved for MTC, taken from among the non-contention based, i.e. dedicated, preambles. The mobile communications network can avoid scheduling those preambles, which have been allocated to MTC UEs to legacy UEs, which legacy UEs believe are non-contention based, i.e. dedicated preambles, when the legacy UE needs a non-contention based preamble. This means that the mobile communications network can now unambiguously distinguish MTC UE from legacy and other UEs.

For this example, the probability of contention is increased for legacy UEs, which are now contending in for example 40 contention-based preambles instead of 64. Or, if the non-contention set is not increased, latency of handover for example, may be increased because of a longer waiting for a non-contention based preamble to become available as the set of such preambles has become smaller. Therefore, in another example another resource domain may be used to give an adapted eNB 101 enough flexibility to minimize the effect of a reduced preamble space on conventional/legacy UEs. One or more of the other domains can therefore allow fully unambiguous differentiation, and not affect legacy UEs as long as the time and frequency resources do not overlap.

The additional configuration of random access preambles may also be used by the MTC UE to determine whether or not access to a cell is allowed. For example, in case of high load, the network may want to assign all of the possible preambles to non-MTC UEs in order to increase the PRACH capacity for those UEs. By disabling or removing the configuration of additional set of communications resources, which may be effectively "hidden" from a class of communications devices, such as MTC-UEs by controlling the sequences allocated to different types of communications devices, a mobile communications network can control access to the available communications resources. For example, this arrangement can be effectively used to bar a cell or prevents access to the cell by MTC UEs.

Figure 11:
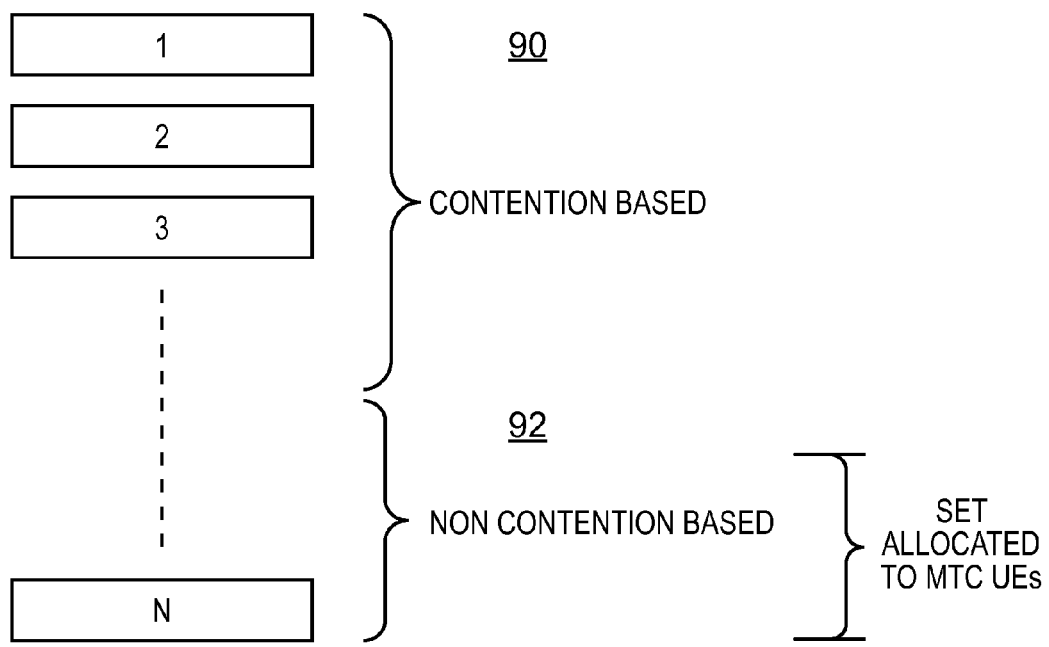
FIG. 11 is a pictorial representation of sequences of resources which are used to form a predetermined set of sequences for forming the random access message by a reduced capability device according to an example of the present technique, FIG. 12 provides an example of resource reservation according to an example of the present technique.

An example allocation of the predetermined sequences (preambles) from a total set of sequences is illustrated in FIG. 11. The total set of sequences referred to as random access preambles is represented pictorially in FIG. 11. As can be seen in FIG. 11 each of the random access preambles sequences 1 to N can be allocated to either contention based access 90 or non-contention based access 92. Non-contention based access is allocated to UEs for example when performing handover. Contention based preambles are allocated to UEs which are requesting the grant of resources in the shared channel 72 of the system bandwidth. As shown in FIG. 9 in one example, a set of preambles from the non-contention based preambles are allocated to MTC UEs for performing uplink contention access for requesting resources within the virtual carrier.

Example Technical Implementation

In one implementation example, the information element RACH-ConfigCommon is transmitted by an adapted eNodeB to the communications devices in the mobile communications network in an information block type 2 and is used to provide configuration information for random access. "numberOfRA-Preambles" indicates the number of non-dedicated random access preambles in TS 36.321. The following example changes are needed:

```
RACH-ConfigCommon ::=    SEQUENCE {
    preambleInfo             SEQUENCE {
        numberOfRA-Preambles     ENUMERATED {
                                     n4, n8, n12, n16 ,n20, n24, n28,
                                     n32, n36, n40, n44, n48, n52, n56,
                                     n60, n64},
    preamblesGroupAConfig    SEQUENCE {
        sizeOfRA-PreamblesGroupA ENUMERATED {
                                     n4, n8, n12, n16 ,n20, n24, n28,
                                     n32, n36, n40, n44, n48, n52, n56,
                                     n60},
```

-continued

```
        messageSizeGroupA           ENUMERATED {b56, b144, b208, b256},
        messagePowerOffsetGroupB    ENUMERATED {
                                       minusinfinity, dB0, dB5, dB8, dB10, dB12,
                                       dB15, dB18},
    numberOfRA-Preambles-MTC        ENUMERATED {
                                       n4, n8, n12, n16 ,n20, n24, n28,
                                       n32, n36, n40, n44, n48, n52, n56,
                                       n60, n64}   OPTIONAL, -- need OP
        ...
    }       OPTIONAL                                                         -- Need OP
    },
    powerRampingParameters          PowerRampingParameters,
    ra-SupervisionInfo              SEQUENCE {
        preambleTransMax                PreambleTransMax,
        ra-ResponseWindowSize           ENUMERATED {
                                           sf2, sf3, sf4, sf5, sf6, sf7,
                                           sf8, sf10},
        mac-ContentionResolutionTimer   ENUMERATED {
                                           sf8, sf16, sf24, sf32, sf40, sf48,
                                           sf56, sf64}
    },
    maxHARQ-Msg3Tx                  INTEGER (1..8),
    ...
}
```

AN EXAMPLE

The mobile communications network signals the values:
numberOfRA-Preambles=n40
numberOfRA-Preambles-MTC=n8

The preambles in the range 0-39 are used by legacy and other UE when transmitting a contention-based random access preamble.

The preambles in the range 40-47 may be used by MTC UEs for transmitting contention based preambles. For this example the legacy UEs believe these are for dedicated preambles and do not use them at all because UE MAC cannot select for contention based random access, and the mobile communications network does not assign these for non-contention based. The preambles in the range 48-63 are for use when performing procedures requiring non-contention based preamble (e.g. handover). This configuration allows the mobile communications network to schedule the random access response within a restricted subset of resources to reduced bandwidth UEs without affecting the overall system performance for legacy UEs.

As explained above, an aspect of the present technique as described for example for the second embodiment, the communications network can be arranged to 'hid resources'. Conventional UEs which are not configured in accordance with the present technique can receive and interpret the preamble (sequence) configurations as normal and are unaware that they are being prevented from using some subset of the possible preambles (sequences), which is to say that some preamble resources are hidden from such UEs. On the other hand, UEs operable in accordance with the present disclosure may be provided with a configuration of the random access resources including the predetermined set of sequences and therefore that their access to preambles is specifically restricted. The restricted access can therefore be used to match their reduced capability. According to the present technique the UE type is unambiguously indicated to the eNodeB because the contention-based preamble reservation is hidden from legacy UEs, but the network and MTC UEs are aware of this arrangement.

An example of using another resource domain is in a TDD LTE system. In such a system, there can be more than one resource region arrangement in a subframe in which a random access channel (PRACH) can be transmitted by UEs, whereas in FDD there is always exactly one resource region arrangement per subframe for PRACH. According to LTE Release 11 specifications, it is possible to define up to sixty four (64) resource region arrangements for forming preambles of random access messages for TDD, but only fifty seven (57) are defined and available for the network to configure. In the example of the LTE Release 11 specifications, up to six (6) of these fifty seven resource region arrangements can be available in a TDD uplink subframe. Therefore, in this example, the specifications can be updated to use some or all of the remaining seven configurations of TDD PRACH to differentiate the allocation of communications resources for different types of communications devices such as for MTC UEs. The seven new configurations can be defined to be non-overlapping in time/-frequency resource with the fifty seven existing configurations. An MTC UE therefore receives both the legacy TDD random access configuration including the predetermined set of sequences for generating random access messages, and so has access to those random access resources, as well receiving an additional configuration of one (or more) among the seven new configurations. A low complexity UE is then required to use only the new configuration it has, whereas other UEs operable in accordance with this disclosure can use either the existing or the new random access configuration. Thus, the eNB knows whether the UE has a reduced capability by virtue of whether it transmits a random access message with one of the allocated and predetermined sequences for the preamble of the random access message in the new or existing configuration. UEs not configured in accordance with the present disclosure have the new PRACH resources hidden from them.

Figure 12:
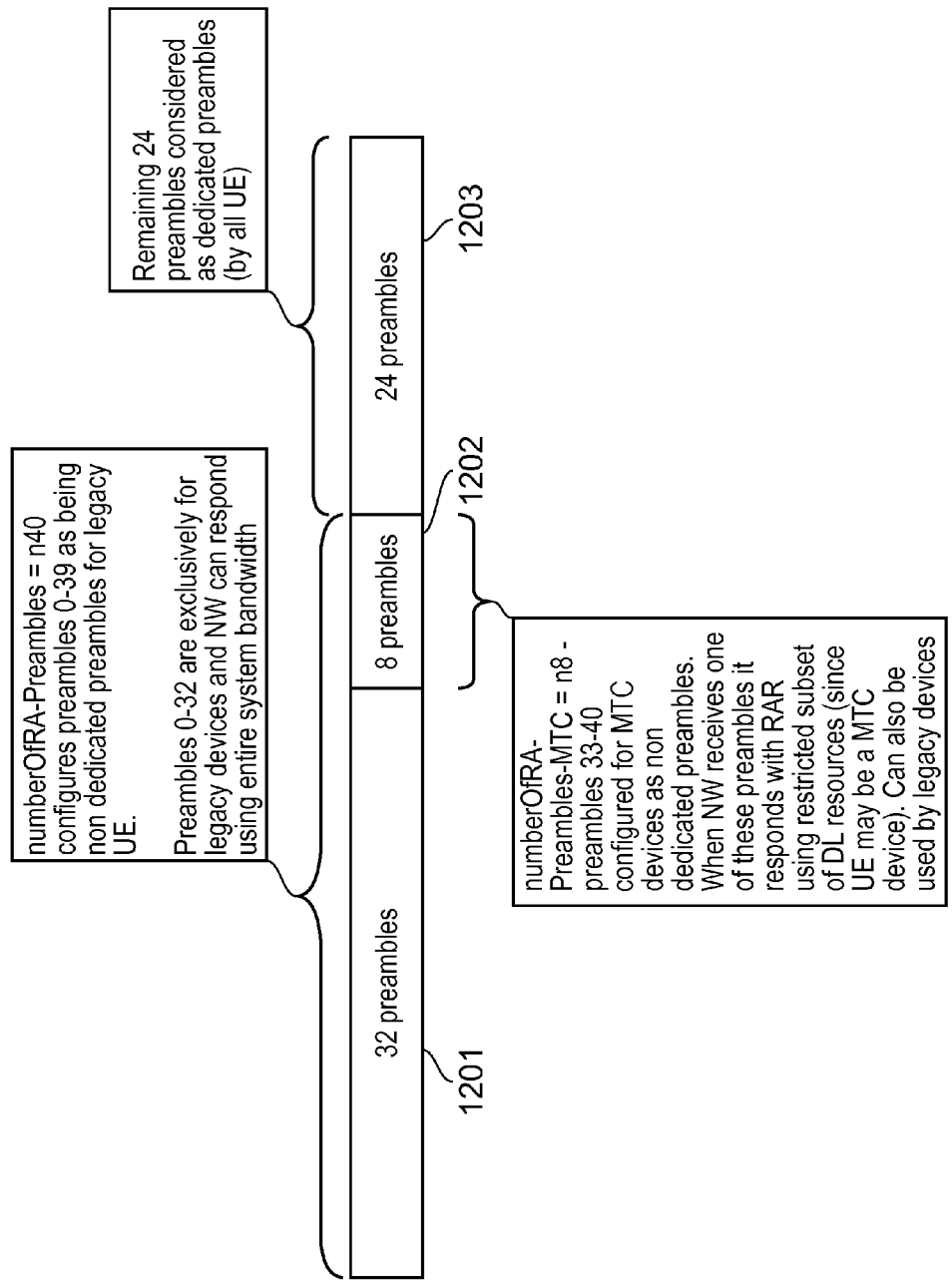
Figure 13:
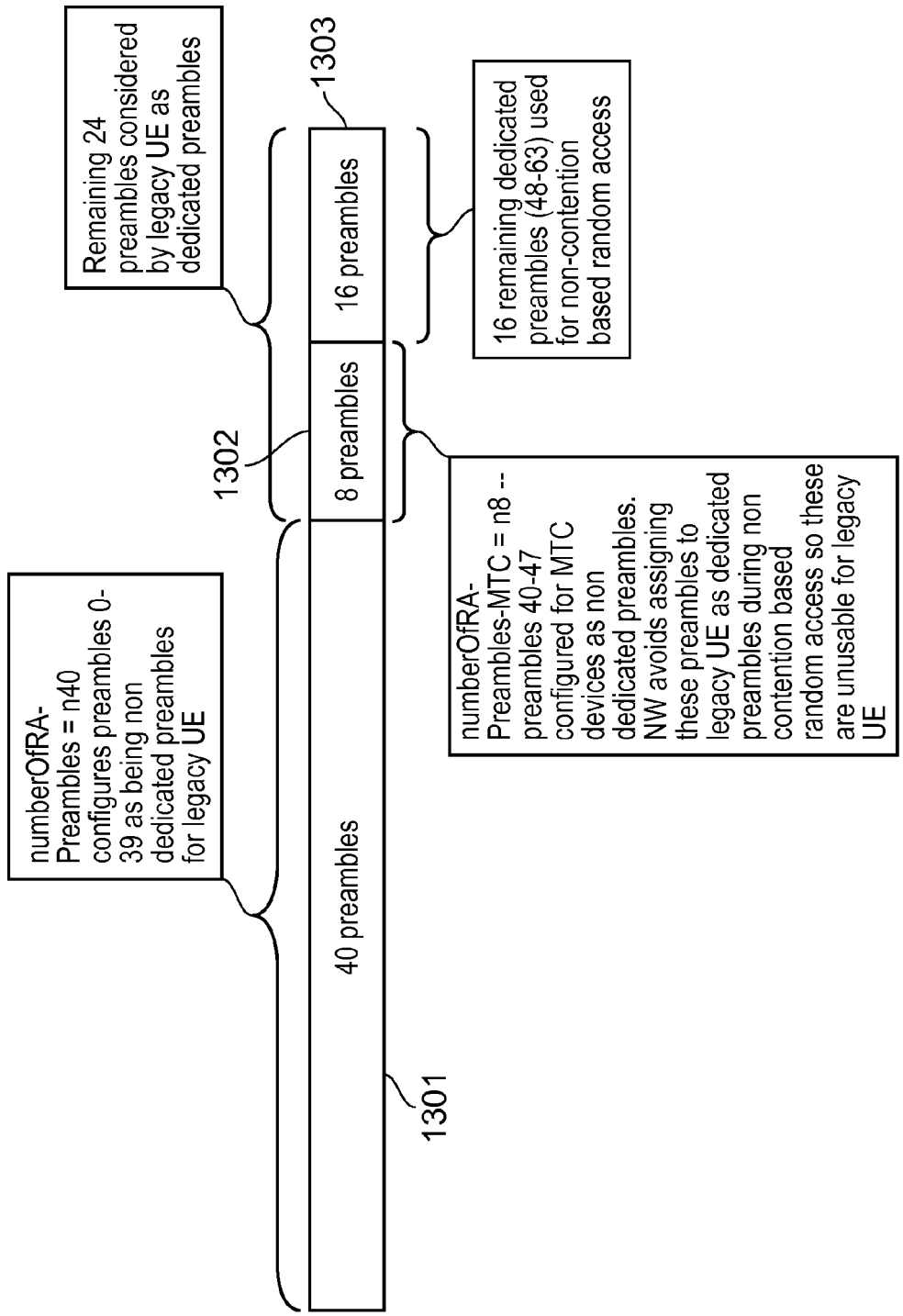
FIG. 13 provides an example of resource reservation accordingly to an example of the present technique.

Further example implementation of the present technique is provided in FIGS. 12 and 13. FIG. 12 provides an example of resource or preamble reservation in accordance with the present technique. The set of 64 preambles has been divided into three sets. A first set 1201 of 32 preambles (i.e. preambles 0 to 31) is for use by legacy or conventional LTE devices in contention-based random access requests. When used by such devices the base station may respond to random access request anywhere in the entire bandwidth of the system. A second set 1202 of eight preambles is primarily reserved for use by MTC or other reduced bandwidth devices for contention based random access requests but legacy devices also view this set as contention based random access preambles and so may also select preambles from this set. When a base station receives a random access request which utilises a preamble from the second set the base station transmits the random access response in a reduced set of resources, such as within the virtual carrier bandwidth for example so that MTC devices are capable of receiving the response. The preambles of the third set 1203, which has a size of 24, are utilised as dedicated non-contention based random access preambles where the preambles may be used by all devices but are allocated by the base station for procedures such as handover for example. An indication of the preamble reservations and set sizes may be provided to communications devices in broadcast resources such as one of the system information blocks. For example a field such as numberOfRA-Preambles-MTC may be used to indicate that the numbed of MTC preambles is eight and therefore that the MTC devices should select from these preambles, and a field such as numberOfRA-Preambles may be used to indicate the number preambles intended for use by legacy devices is 40.

FIG. 13 provides a further example of preamble reservation or allocation in accordance with an example of the present technique. As in FIG. 12, the set of 64 preambles divided into three sets. A first set 1301 of 40 preambles is equivalent to the first set of FIG. 12 and is intended for use as non-dedicated preambles for contention based random access procedures by legacy communications devices. The remaining 24 preambles, although divided into two sets i.e. a second set 1302 and a third set 1303, in contrast to FIG. 12 both these sets are viewed as non-contention based preambles by legacy devices so that they are not selected by such devices. The preambles of the second set 1302 are used as contention based random access preambles by MTC devices and the base station avoids allocating the preambles of the second set to legacy devices. The preambles of the third set 1303 are used as a set of non-contention based random access preambles and the base station is free to allocate these to any communications device. As described with reference to FIG. 12, indications of the preamble sets may be provided to the communications devices such that MTC devices and legacy devices select contention based preambles from the correct sets(s).

The following numbered paragraphs defined further example aspects and features of the present technique:

1. A method of transmitting data from a communications device to a mobile communications network or receiving data from the mobile communications network at the mobile communications device, the method comprising providing, by the mobile communications network, a wireless access interface, for transmitting and receiving data to and from communications devices, the wireless access interface providing communications resources within a system bandwidth and in time divided units providing communications resources within the system bandwidth for allocation to communications devices of a first type and a second type, the first type of the communications devices having a different capability to the second type of communications devices, generating, at the communications device, a random access message, by selecting a sequence from a predetermined set of sequences, which have been allocated to the communications devices of the second type, transmitting the random access message from the communications device to the wireless communications network, and in response to the random access message, receiving a random access response at the communications device transmitted according to the capability of the communications device of the second type, the random access message being recognised as being from a communications device of the second type from the selected one of the predetermined sequences allocated to the communications devices of the second type.

2. A method according to paragraph 1, wherein the wireless access interface includes a virtual carrier defining a set of communications resources of the system bandwidth for preferable allocation to communications devices of the second type for transmitting or receiving signals within the communications resources of the virtual carrier bandwidth, and the receiving the random access response at the communications device transmitted according to the capability of the communications device of the second type, includes receiving the random access response at the communications device from communications resources allocated to the communications device within the virtual carrier bandwidth, the communications device of the second type having a reduced capability compared to communications devices of the first type.

3. A method according to paragraphs 1 or 2, wherein the transmitting the random access message from the communications device to the wireless communications network, includes configuring, by the mobile communications network, the communications resources of the wireless access interface for the communications device of the second type to transmit the random access message, and transmitting the random access message from the communications device to the wireless communications network in communications resources configured by the mobile communications network.

4. A method according to paragraph 3, wherein the configuring, by the mobile communications network, the communications resources of the wireless access interface for the communications device of the second type to transmit the random access message includes configuring communications resources for transmitting the random access message in dependence on the capability of the communications device of the second type.

5. A method according to paragraph 4, wherein the configuring, by the mobile communications network, the communications resources of the wireless access interface for the communications device of the second type to transmit the random access message includes configuring the communications resources of the wireless access interface to include one or more random access channels for the communications device of the second type to transmit the random access message.

6. A method according to paragraph 1, comprising transmitting to the communications device from the mobile communications network an indication of the predetermined set of sequences, which are allocated to the reduced capability devices for generating the random access messages.

7. A method according to paragraph 6, comprising selecting the predetermined set of sequences from a set of sequences comprising sequences for generating non-contention based random access messages and sequences for generating contention based random access messages, wherein the predetermined set of sequences which are allocated to the reduced capability devices for contention based random access are selected from the sequences for generating non-contention based random access messages.

8 A method according to any of paragraphs 1 to 7, wherein the different capability of the first type of the communications devices compared to the second type of communications devices, includes a maximum bandwidth of a communications channel in which signals are received, which the communications device of the second type can decode compared with the communications devices of the first type.

9. A method according to any of paragraphs 1 to 7, wherein the different capability of the first type of the communications devices compared to the second type of communications devices, includes a minimum number of antennas available to the communications devices of the first type compared with the communications devices of the second type.

10. A method according to any of paragraphs 1 to 7, wherein the different capability of the first type of the communications devices compared to the second type of communications devices, includes a maximum rate of processing information bits by the communications device of the second type compared with the communications devices of the first type.

11. A communications device for transmitting data to a mobile communications network or receiving data from the mobile communications network, the communications device comprising a transmitter unit configured to transmit signals representing data via a wireless access interface to an infrastructure equipment of the mobile communications network, the wireless access interface providing communications resources within a system bandwidth and in time divided units providing communications resources in the system bandwidth for allocation to communications devices of a first and a second type, the first type of the communications devices having a different capability to the second type of communications devices, a receiver configured to receive signals from the infrastructure equipment via the wireless access interface, and a controller configured in combination with the transmitter and the receiver to generate a random access message, by selecting a sequence from a predetermined set of sequences, which have been allocated to the communications devices of the second type, to transmit the random access message from the communications device to the mobile communications network, and in response to the random access message, to receive a random access response transmitted according to the capability of the communications device of the second type, the random access message being recognised as being from a reduced capability terminal from the selected one of the predetermined sequences allocated to reduced capability terminals.

12. A communications device according to paragraph 11, wherein the wireless access interface includes a virtual carrier defining a set of communications resources of the system bandwidth for preferable allocation to communications devices of the second type for transmitting or receiving signals within the communications resources of the virtual carrier bandwidth, and the controller is configured in combination with the receiver to receive the random access response in accordance with the capability of the communications device of the second type by receiving the random access response at the communications device from communications resources allocated to the communications device within the virtual carrier bandwidth, the communications device of the second type having a reduced capability compared to communications devices of the first type.

13. A communications device according to paragraphs 11 or 12, wherein the controller is configured in combination with the transmitter to transmit the random access message from the communications device to the wireless communications network the communications resources of the wireless access interface, which have been configured by the mobile communications network by the communications device of the second type to transmit the random access message.

14. A communications device according to paragraph 13, wherein the communications resources of the wireless access interface are configured by the mobile communications network for transmitting the random access message in dependence on the capability of the communications device of the second type.

15. A communications device according to paragraph 14, wherein the communications resources of the wireless access interface configured by the mobile communications network for transmitting the random access message includes providing one or more a random access channels for the communications device of the second type to transmit the random access message.

16. A communications device according to paragraph 11, wherein the controller is configured in combination with the receiver to receive from the mobile communications network an indication of the predetermined set of sequences, which are allocated to the reduced capability devices for generating the random access messages.

17. A communications device according to paragraph 16, wherein the predetermined set of sequences are selected from a set of sequences comprising sequences for generating non-contention based random access messages and sequences for generating contention based random access messages, wherein the predetermined set of sequences which are allocated to the reduced capability devices for contention based random access are selected from the sequences for generating non-contention based random access messages.

18. A communications device according to any of paragraphs 11 to 17, wherein the different capability of the first type of the communications devices compared to the second type of communications devices, includes a maximum bandwidth of a communications channel in which signals are received, which the communications device of the second type can decode compared with the communications devices of the first type.

19. A communications device according to any of paragraphs 11 to 17, wherein the different capability of the first type of the communications devices compared to the second type of communications devices, includes is a minimum number of antennas available to the communications devices of the first type compared with the communications devices of the second type.

20. A communications device according to any of paragraphs 1 to 7, wherein the different capability of the first type of the communications devices compared to the second type of communications devices, includes a maximum rate of processing information bits by the communications device of the second type compared with the communications devices of the first type.

21. An infrastructure equipment for forming part of a mobile communications network, the infrastructure equipment comprising a transmitter unit configured to transmit signals via a wireless access interface to communications devices, and a receiver configured to receive signals from the communications devices via the wireless access interface, and a controller configured in combination with the transmitter and the receiver to form the wireless access interface, the wireless access interface providing communications resources within a system bandwidth and, in time divided units providing communications resources in the system bandwidth for allocation to the communications devices of a first type and a second type, the first type of the communications devices having a different capability to the second type of communications devices, wherein the controller is configured in combination with the transmitter and the receiver to receive a random access message from one of the communications device via the wireless access interface, the communications device being a communications device of the second type and the random access message having been generated by the communications device of the second type by selecting a sequence from one of a predetermined set of sequences, which have been allocated to communications devices of the second type, to identify from the received random access message that the communications device which transmitted the random access message is a communications device of the second type, and in response to the random access message, to transmit a random access response according to the capability of the communications device of the second type, the random access message being recognised as being from a reduced capability terminal from the selected one of the predetermined sequences allocated to communications devices of the second type.

22. An infrastructure equipment according to paragraph 21, wherein the wireless access interface includes a virtual carrier defining a set of communications resources of the system bandwidth for preferable allocation to communications devices of the second type for transmitting or receiving signals within the communications resources of the virtual carrier bandwidth, and the receiving the random access response at the communications device transmitted according to the capability of the communications device of the second type, the controller is configured in combination with the transmitter and the receiver to transmit the random access response at the communications device from communications resources allocated to the communications device within the virtual carrier bandwidth, the communications device of the second type having a reduced capability compared to communications devices of the first type.

23. An infrastructure equipment according to paragraphs 21 or 22, wherein the controller is configured in combination with the transmitter and the receiver to configure the communications resources of the wireless access interface for the communications device of the second type to transmit the random access message, and to transmit the random access message from the communications device to the wireless communications network in communications resources configured by the mobile communications network.

24. An infrastructure equipment according to paragraph 23, wherein the controller is configured in combination with the transmitter and the receiver to configure the communications resources of the wireless access interface for receiving the random access message in dependence on the capability of the communications device of the second type.

25. An infrastructure equipment according to paragraph 24, wherein the controller is configured in combination with the transmitter and the receiver to configure the communications resources of the wireless access interface to include one or more a random access channels for the communications device of the second type to transmit the random access message.

26. An infrastructure equipment according to paragraph 21, wherein the controller is configured in combination with the transmitter to transmit to the communications devices from the mobile communications network an indication of the predetermined set of sequences, which are allocated to the reduced capability devices for generating the random access messages.

27. An infrastructure equipment according to paragraph 26, wherein the controller is configured to select the predetermined set of sequences from a set of sequences comprising sequences for generating non-contention based random access messages and sequences for generating contention based random access messages, wherein the predetermined set of sequences which are allocated to the reduced capability devices for contention based random access are selected from the sequences for generating non-contention based random access messages.

28. An infrastructure equipment according to any of paragraphs 21 to 27, wherein the different capability of the first type of the communications devices compared to the second type of communications devices, includes a maximum bandwidth of a communications channel in which signals are received, which the communications device of the second type can decode compared with the communications devices of the first type.

29. An infrastructure equipment according to any of paragraphs 21 to 27, wherein the different capability of the first type of the communications devices compared to the second type of communications devices, includes is a minimum number of antennas available to the communications devices of the first type compared with the communications devices of the second type.

30. An infrastructure equipment according to any of paragraphs 21 to 27, wherein the different capability of the first type of the communications devices compared to the second type of communications devices, includes a maximum rate of processing information bits by the communications device of the second type compared with the communications devices of the first type.

31. A mobile communications network including an infrastructure equipment according to any of paragraphs 21 to 30.

32. A communications system comprising a communications device according to any of paragraphs 11 to 20 and an infrastructure equipment according to any of paragraphs 21 to 30.

33. A computer readable medium having stored thereon a computer program, which when loaded onto a processor performs the method of any of paragraphs 1 to 10.

Various further aspects and features of the present invention are defined in the appended claims. It will appreciated that the example of LTE and terminology in respect of LTE has been provided for one example only and other access networks which are 3GPP or non-3GPP may be used.

REFERENCES

[1] UK patent application GB 1101970.0
[2] UK patent application GB 1101981.7

[3] UK patent application GB 1101966.8
[4] UK patent application GB 1101983.3
[5] UK patent application GB 1101853.8
[6] UK patent application GB 1101982.5
[7] UK patent application GB 1101980.9
[8] UK patent application GB 1101972.6
[9] Document submitted for discussion at 3GPP TSG-RAN WG2 #84 "Analysis of RAN2 Impacts of Low Cost UE" ZTE (R2-133908)
[10] Document submitted for discussion at 3GPP TSG-RAN WG2 #84 "Capabilities of Low Cost/Complexity MTC UEs" Ericsson (R2-134299)
[11] Document submitted for discussion at 3GPP TSG-RAN WG2 #84 "Impacts of Narrow Bandwidth Characteristic of Low Cost MTC UE" LG Electronics Inc. (R2-134371)

The invention claimed is:

1. A method of transmitting data from a communications device to a mobile communications network or receiving data from the mobile communications network at the mobile communications device, the method comprising:
providing, by the mobile communications network, a wireless access interface, for transmitting and receiving data to and from communications devices, the wireless access interface providing communications resources within a system bandwidth and in time divided units providing communications resources within the system bandwidth for allocation to communications devices of a first type and a second type, the first type of the communications devices having a different capability to the second type of communications devices;
generating, at the communications device, a random access message, by selecting a sequence from a predetermined set of sequences, which have been allocated to the communications devices of the second type;
transmitting the random access message from the communications device to the wireless communications network; and
in response to the random access message, receiving a random access response at the communications device transmitted according to the capability of the communications device of the second type, the random access message being recognized as being from a communications device of the second type from the selected one of the predetermined sequences allocated to the communications devices of the second type, wherein
the wireless access interface includes a narrowband carrier defining a set of communications resources of the system bandwidth for allocation to communications devices of the second type for transmitting or receiving signals within the communications resources of the narrowband carrier bandwidth, and
the receiving the random access response at the communications device transmitted according to the capability of the communications device of the second type includes receiving the random access response at the communications device from communications resources allocated to the communications device within the narrowband carrier bandwidth, the communications device of the second type having a reduced capability compared to communications devices of the first type.

2. The method of claim 1, wherein the transmitting the random access message from the communications device to the wireless communications network, includes
configuring, by the mobile communications network, the communications resources of the wireless access interface for the communications device of the second type to transmit the random access message, and
transmitting the random access message from the communications device to the wireless communications network in communications resources configured by the mobile communications network.

3. The method of claim 2, wherein the configuring, by the mobile communications network, the communications resources of the wireless access interface for the communications device of the second type to transmit the random access message includes
configuring communications resources for transmitting the random access message in dependence on the capability of the communications device of the second type.

4. The method of claim 3, wherein the configuring, by the mobile communications network, the communications resources of the wireless access interface for the communications device of the second type to transmit the random access message includes configuring the communications resources of the wireless access interface to include one or more random access channels for the communications device of the second type to transmit the random access message.

5. The method of claim 1, comprising:
transmitting to the communications device from the mobile communications network an indication of the predetermined set of sequences, which are allocated to the communication devices of the second type for generating the random access messages.

6. The method of claim 5, comprising:
selecting the predetermined set of sequences from a set of sequences comprising sequences for generating non-contention based random access messages and sequences for generating contention based random access messages, wherein the predetermined set of sequences which are allocated to the communication devices of the second type for contention based random access are selected from the sequences for generating non-contention based random access messages.

7. The method of claim 1, wherein the different capability of the first type of the communications devices compared to the second type of communications devices, includes a maximum bandwidth of a communications channel in which signals are received, which the communications device of the second type can decode compared with the communications devices of the first type.

8. The method of claim 1, wherein the different capability of the first type of the communications devices compared to the second type of communications devices, includes a minimum number of antennas available to the communications devices of the first type compared with the communications devices of the second type.

9. The method of claim 1, wherein the different capability of the first type of the communications devices compared to the second type of communications devices, includes a maximum rate of processing information bits by the communications device of the second type compared with the communications devices of the first type.

10. A communications device for transmitting data to a mobile communications network or receiving data from the mobile communications network, the communications device comprising:
a transmitter configured to transmit signals representing data via a wireless access interface to an infrastructure equipment of the mobile communications network, the wireless access interface providing communications resources within a system bandwidth and in time divided units providing communications resources in the system bandwidth for allocation to communications devices of a first and a second type, the first type of the communications devices having a different capability to the second type of communications devices, a receiver configured to receive signals from the infrastructure equipment via the wireless access interface, and a controller configured in combination with the transmitter and the receiver to generate a random access message, by selecting a sequence from a predetermined set of sequences, which have been allocated to the communications devices of the second type, transmit the random access message from the communications device to the mobile communications network, and in response to the random access message, to receive a random access response transmitted according to the capability of the communications device of the second type, the random access message being recognized as being from a reduced capability terminal from the selected one of the predetermined sequences allocated to reduced capability terminals, wherein the wireless access interface includes a narrowband carrier defining a set of communications resources of the system bandwidth for allocation to communications devices of the second type for transmitting or receiving signals within the communications resources of the narrowband carrier bandwidth, and the controller is configured in combination with the receiver to receive the random access response in accordance with the capability of the communications device of the second type by receiving the random access response at the communications device from communications resources allocated to the communications device within the narrowband carrier bandwidth, the communications device of the second type having a reduced capability compared to communications devices of the first type.

11. The communications device of claim 10, wherein the controller is configured in combination with the transmitter to transmit the random access message from the communications device to the wireless communications network the communications resources of the wireless access interface, which have been configured by the mobile communications network by the communications device of the second type to transmit the random access message.

12. The communications device of claim 11, wherein the communications resources of the wireless access interface are configured by the mobile communications network for transmitting the random access message in dependence on the capability of the communications device of the second type.

13. The communications device of claim 12, wherein the communications resources of the wireless access interface configured by the mobile communications network for transmitting the random access message includes providing one or more a random access channels for the communications device of the second type to transmit the random access message.

14. The communications device of claim 10, wherein the controller is configured in combination with the receiver to receive from the mobile communications network an indication of the predetermined set of sequences, which are allocated to the communication devices of the second type for generating the random access messages.

15. The communications device of claim 14, wherein the predetermined set of sequences are selected from a set of sequences comprising sequences for generating non-contention based random access messages and sequences for generating contention based random access messages, wherein the predetermined set of sequences which are allocated to the communication devices of the second type for contention based random access are selected from the sequences for generating non-contention based random access messages.

16. The communications device of claim 10, wherein the different capability of the first type of the communications devices compared to the second type of communications devices, includes a maximum bandwidth of a communications channel in which signals are received, which the communications device of the second type can decode compared with the communications devices of the first type.

17. The communications device of claim 10, wherein the different capability of the first type of the communications devices compared to the second type of communications devices, includes is a minimum number of antennas available to the communications devices of the first type compared with the communications devices of the second type.

18. The communications device of claim 1, wherein the different capability of the first type of the communications devices compared to the second type of communications devices, includes a maximum rate of processing information bits by the communications device of the second type compared with the communications devices of the first type.

19. A method of transmitting data from a communications device to a mobile communications network or receiving data from the mobile communications network at the mobile communications device, the method comprising:

providing, by the mobile communications network, a wireless access interface, for transmitting and receiving data to and from communications devices, the wireless access interface providing communications resources within a system bandwidth and in time divided units providing communications resources within the system bandwidth for allocation to communications devices of a first type and a second type, the first type of the communications devices having a different capability to the second type of communications devices;

transmitting to the communications device from the mobile communications network an indication of a predetermined set of sequences, which are allocated to the second type of communications devices for generating the random access messages;

selecting at least one predetermined sequence from the predetermined set of sequences comprising sequences for generating non-contention based random access messages and sequences for generating contention based random access messages, wherein the predetermined set of sequences which are allocated to the second type of communications devices for contention based random access are selected from the sequences for generating non-contention based random access messages;

generating, at the communications device, a random access message based on the selected at least one predetermined sequence;

transmitting the random access message from the communications device to the wireless communications network; and in response to the random access message, receiving a random access response at the communications device transmitted according to the capability of the communications device of the second type, the random access message being recognized as being from a communications device of the second type based on the selected at least one predetermined sequence.

20. A communications device for transmitting data to a mobile communications network or receiving data from the mobile communications network, the communications device comprising:

a transmitter configured to transmit signals representing data via a wireless access interface to an infrastructure equipment of the mobile communications network, the wireless access interface providing communications resources within a system bandwidth and in time divided units providing communications resources in the system bandwidth for allocation to communications devices of a first and a second type, the first type of the communications devices having a different capability to the second type of communications devices, a receiver configured to receive signals from the infrastructure equipment via the wireless access interface, and a controller configured in combination with the transmitter and the receiver to receive from the mobile communications network an indication of a predetermined set of sequences, which are allocated to the second type of communications devices;

select at least one of the predetermined set of sequences from the predetermined set of sequences comprising sequences for generating non-contention based random access messages and sequences for generating contention based random access messages, wherein the predetermined set of sequences which are allocated to the second type of communications devices for contention based random access are selected from the sequences for generating non-contention based random access messages;

generate a random access message based on the selected at least one predetermined sequence;

transmit the random access message from the communications device to the mobile communications network, and in response to the random access message, to receive a random access response transmitted according to the capability of the communications device of the second type, the random access message being recognized as being from a second type of communications device based on the selected at least one of the predetermined set of sequences.

* * * * *